United States Patent [19]

Miura

[11] Patent Number: 4,782,351

[45] Date of Patent: Nov. 1, 1988

[54] RECORDING APPARATUS

[75] Inventor: Kunihiko Miura, Hiratsuka, Japan

[73] Assignee: Kabushiki Kaisha Toshiba, Japan

[21] Appl. No.: 5,742

[22] Filed: Jan. 21, 1987

[30] Foreign Application Priority Data

Jan. 31, 1986 [JP] Japan .................................. 61-18234

[51] Int. Cl.[4] ....................... G01D 15/10; G01D 15/16

[52] U.S. Cl. ............................ 346/140 R; 346/76 PH; 400/196; 400/126

[58] Field of Search ..................... 346/76 PH, 75, 140, 346/153.1, 139 C; 400/196, 202, 202.1, 202.2, 197; 355/3 SH, 14 SH, 15, 3 C, 14 C; 358/296

[56] References Cited

U.S. PATENT DOCUMENTS

| | | | |
|---|---|---|---|
| 4,562,444 | 12/1985 | Nagashima et al. . | |
| 4,590,485 | 5/1986 | Uramoto ......................... | 346/76 PH |
| 4,630,075 | 12/1986 | Hori ................................ | 346/140 R |
| 4,672,391 | 6/1987 | Hakoyama et al. ........ | 346/139 C X |

OTHER PUBLICATIONS

Ser. No. 868,074.

*Primary Examiner*—Joseph W. Hartary
*Assistant Examiner*—Mark Reinhart
*Attorney, Agent, or Firm*—Finnegan, Henderson, Farabow, Garrett and Dunner

[57] ABSTRACT

A recording apparatus which is for filling recording ink in a film with numerous minute orifices and heating the ink rapidly with heating elements to spurt the ink from the orifices by means of the pressure of bubbles generated in heating to record data on a member to be recorded by use a source voltage from outside. The present recording apparatus comprises main switch for controlling the ON/OFF of the source voltage; sensor for detecting the ON/OFF state of said main switch; members for housing the film in a state of tight sealing; drive unit for variably controlling the motion of the film; sensor for detecting that the film is housed in said film housing member; a main power supply for supplying an operating power to at least said film motion drive unit by receiving the source voltage; and relay for shutting off the supply of the source voltage to said main power supply only when a detection signal is supplied from said film housing sensor. The film motion drive unit controls to transport a predetermined portion of the film into said film housing members according to the OFF state detection signal from the ON/OFF state sensor.

8 Claims, 28 Drawing Sheets

SPEED-TORQUE CHARACTERISTIC CURVE

RECORDING APPARATUS

BACKGROUND OF THE INVENTION

1. Field of the Invention

The present invention relates to a nonimpact type recording apparatus which carries out recording by rapidly heating, with heating elements, a moving film that has numerous ink-filled pores, and by jetting out ink within numerous pores by means of the pressure of bubbles that are generated in heating.

2. Description of the Prior Art

As an impact type recording apparatus, there is known the ink jet type apparatus (ink jet printer).

The ink jet printer carries out printing by jetting out ink that is filled in nozzles on a recording paper by the distorting force due to piezoelectric element, electrostatic force, or the like. While the ink jet printer has excellent aspects such as quietness, low power, ease in miniaturization, and so on, the nozzles tend to be blinded so that it has not yet succeeded in gaining reliability.

Then, there has been proposed a new recording apparatus which eliminates the drawbacks that existed in the prior-art ink jet printer (see Japanese Patent No. 60-71260).

This recording apparatus uses a film that has, instead of orifice nozzles, a multi-orifice portion that is formed by a multitude of orifices of diameter 10 to 200 um. Ink is filled in numerous orifices, and the ink-filled multi-orifice portion is heated rapidly with heating elements, and recording is carried out by letting ink in the numerous orifices gushing on a recording paper by means of the pressure of bubbles that are generated.

Now, in normal conditions, the apparatus proposed is able to eliminate the problem of blinding of nozzles, while maintaining the advantageous aspects of the jet ink printer. However, in the apparatus, happens that the film is in contact with the atmosphere for many hours. In this situation, the ink in the numerous orifices dries up sometimes, resulting in the problem of blinding of the numerous orifices.

SUMMARY OF THE INVENTION

An object of the present invention is to provide a recording apparatus which can prevent the drying of ink and the blinding of the multi-orifice portion.

A feature of the present invention is that in a recording apparatus which is for filling recording ink in a film with numerous minute orifices and heating the ink rapidly with heating elements to spurt the ink from the orifices by means of the pressure of bubbles generated in heating to record data on a member to be recorded by using a source voltage from outside, the present recording apparatus comprises main switch for controlling the ON/OFF of the source voltage; sensor for detecting the ON/OFF state of said main switch; members for housing the film in a state of tight sealing; drive unit for variably controlling the motion of the film; sensor for detecting that the film is housed in said film housing member; a main power supply for supplying an operating power to at least said film motion drive unit by receiving the source voltage; and a relay for shutting off the supply of the source voltage to said main power supply only when a detection signal is supplied from said film housing sensor. The film motion drive unit controls to transport a predetermined portion of the film into said film housing members according to the OFF state detection signal from the ON/OFF state sensor.

These and other objects, features and advantages of the present invention will be more apparent from the following description of a preferred embodiment, taken in conjunction with the accompanying drawings.

DESCRIPTION OF THE PREFERRED EMBODIMENTS

Figure 1:
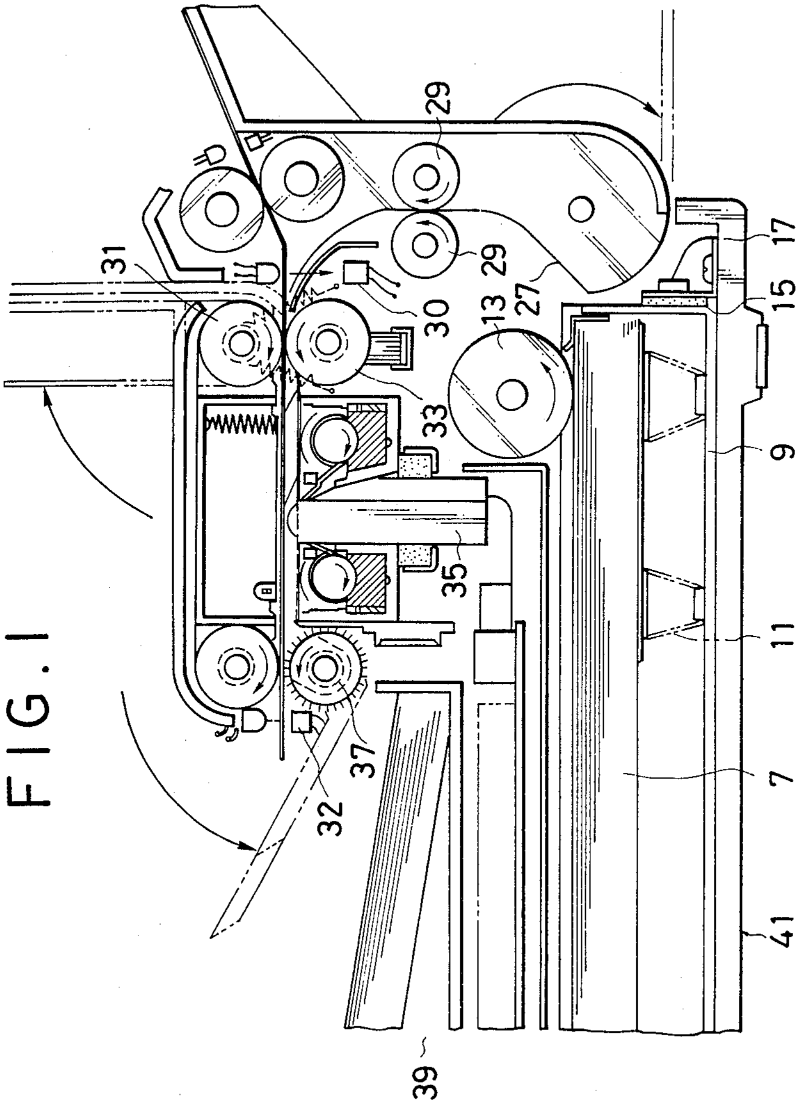
FIG. 1 and FIG. 2 are a side view and a front view which show the overall configuration of the recording apparatus in accordance with the present invention.

Referring to FIG. 1, there is shown a recording apparatus embodying the present invention.

As shown in FIG. 1, a recording paper (member to be recorded) 7 is housed in a cassette 9, and is pushed upward by a pushing-up springs 11 to make a contact with a feed roller 13. On the cassette 9 there is provided a claw 15 for discriminating the size which turns on a cassette discrimination switch 17. In this way, the cassette size (of A4, B5, and so on) is discriminated.

Figure 2:
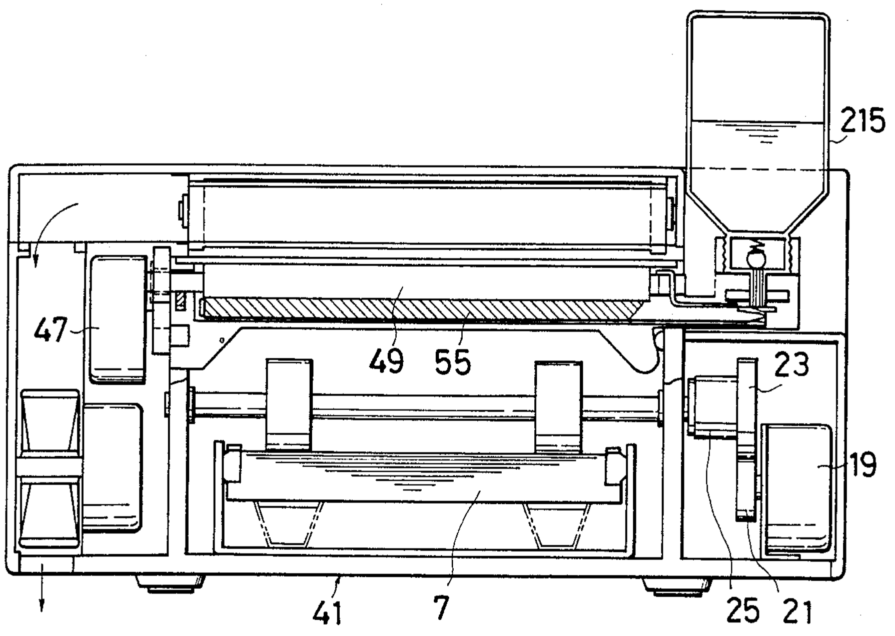

In response to a recording start command from print control unit that will be described later, the feed roller 13 causes a paper forwarding motor 19 shown in FIG. 2 rotated backward via gears 21 and 23 and a one-way clutch 25, to send recording papers 7 one sheet at a time. The recording paper 7 is raised along a first feed paper guide 27, transported while being held between the feed rollers 29, the tip of the paper is detected by a first paper detection sensor 30, and is put in order at the position where a first roller 31 and a resist roller 33 come into a rotational contact. The resist roller 33 is linked to the paper forwarding motor 19 via a one-way clutch unit (not shown in FIG. 2), and is rotated when the paper forwarding motor 19 rotated forwardly.

The recording paper 7 which is put in order by the resist roller 33 is sent by the rotation of the resist roller 33 to a thermal head 35 where a predetermined printing is carried out on the recording paper 7 as will be described later. The recording paper for which recording is completed passes by a paper ejecting roller 37 and is ejected to a tray for ejected paper 39.

A film 1 has multitude of orifices of diameter 10 to 200 um that are filled with recording ink. Recording is accomplished by spurting ink drops by means of the pressure of bubbles that are generated by rapid heating of the ink-filled multi-orifice portion 3 with heating elements 5.

Figure 3:
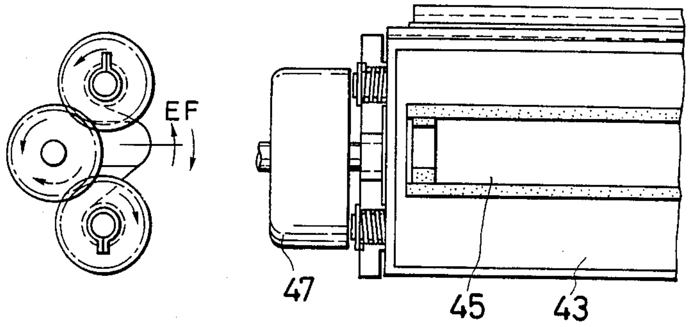
FIG. 3 is a partial block diagram of the film cartridge in the recording apparatus shown in FIG. 1.

The thermal head 35 is fixed to body 41, and a film cartridge 43 in which is housed the film 1 has a film exposure unit 45 with an aperture in a parallelepiped case, as shown in FIG. 3, and is set on the body 41 so as to enclose the thermal head 35 with the exposure unit 45. On the outer side section of the film cartridge 43 there is provided a film driving motor (pulse motor) 47 by which film 1 is transported.

Figure 4:
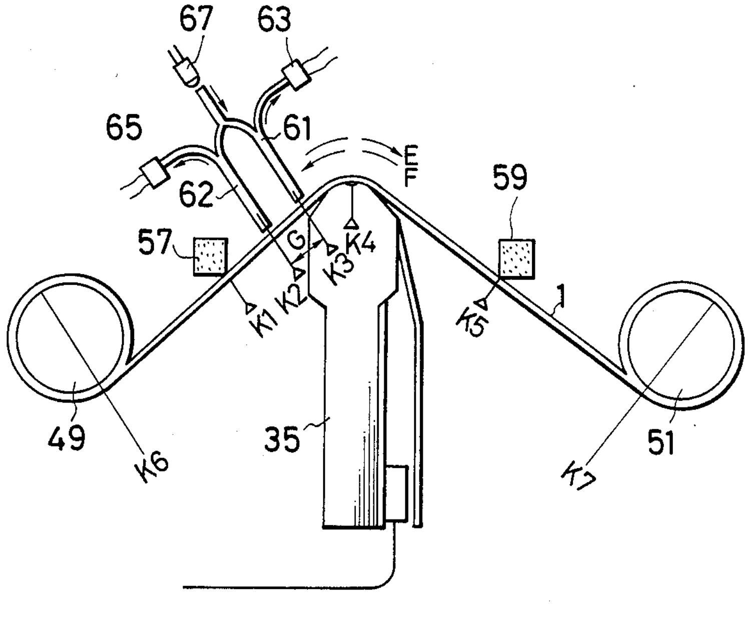
FIG. 4 is an explanatory diagram for film transportation control unit.
Figure 5:
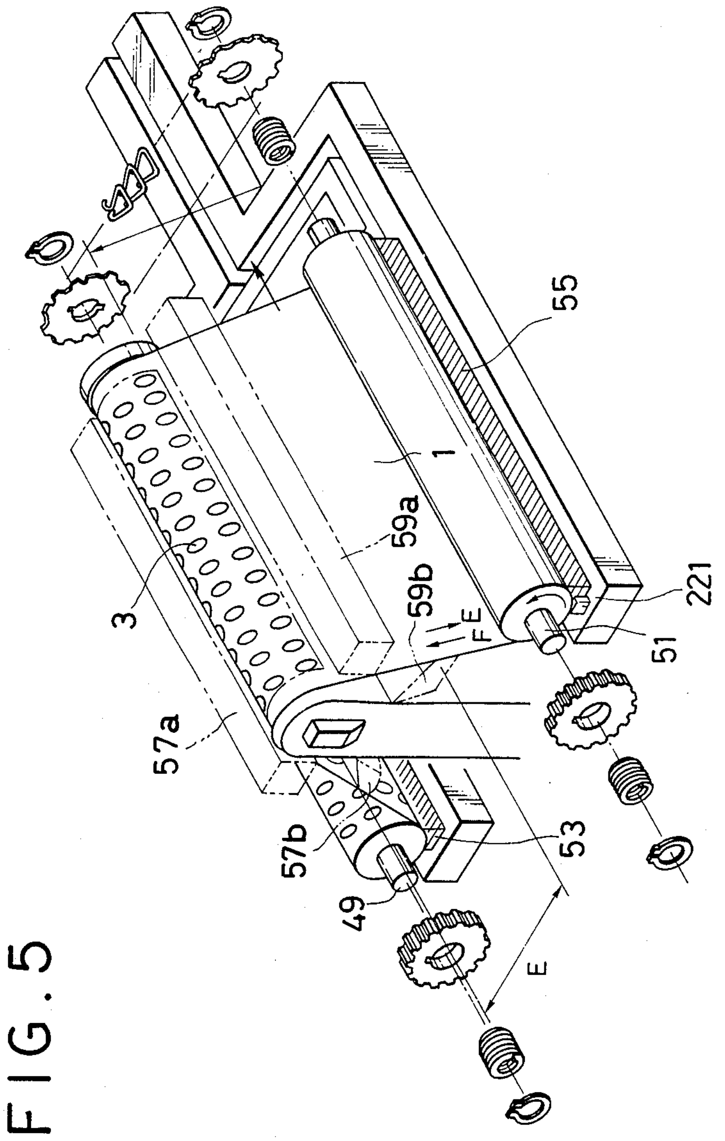
FIG. 5 is an overall block diagram for the film driving mechanism.

When the operation of the apparatus is stopped, the multi-orifice portion 3 of the film 1 is housed in the, film cartridge 43. Therefore, exposure of the multi-orifice portion 3 and blinding of the multi-orifice portion 3 due to the drying of the ink is prevented. As shown in FIGS. 3, 4, and 5, the multi-orifice portion 3 is sealed by two pairs of ink scraping members **57*a*, 57*b*, 59*a*, 59*b* which consist of rubber, and the cartridge 43** when the multi-orifice portion is housed in the cartridge.

Control for Positioning and Transportation of the Film

It is necessary for the present apparatus to be controlled in such a way as to have the positions of both ends of the multi-orifice portion 3 detected, and recording is started when the front end of the multi-orifice portion arrives above the heating element 5.

In FIG. 4 is shown the positional relationship between the film 1 and sensors for detecting the position of the film 1, with the thermal head 35 as the center.

The film 1 is driven in the E and F directions in the figure, centered around the thermal head 35, by the film driving motor 47, to be taken up by the paper winding shafts 51 and 49, respectively.

Further, as shown in FIG. 5, the multi-orifice portion 3 of the film which is wound on each of the paper winding shafts 49 and 51, is filled with ink by making contact with ink supply members 53 and 55 made of felt and filled with ink. Ink which is attached to portions other than the multi-orifice portion 3 is scraped off with surplus ink scrapers 57 and 59.

Moreover, on the film 1 there are provided a first and a second film position detection fibers 61 and 62 which detect the position detection holes that will be described later. Both fibers 61 and 62 are positioned at the points $K_2$ and $K_3$, respectively, arranged with a separation of a distance G. At ends of both fibers 61 and 62 there are provided a first and a second photosensors 63 and 65 for detecting reflected light from the film 1. Reflected light is obtained by reflecting light, which is supplied from a light-emitting element 67, on the surface of the film 1 via the first and the second fibers 61 and 62.

Figure 6:
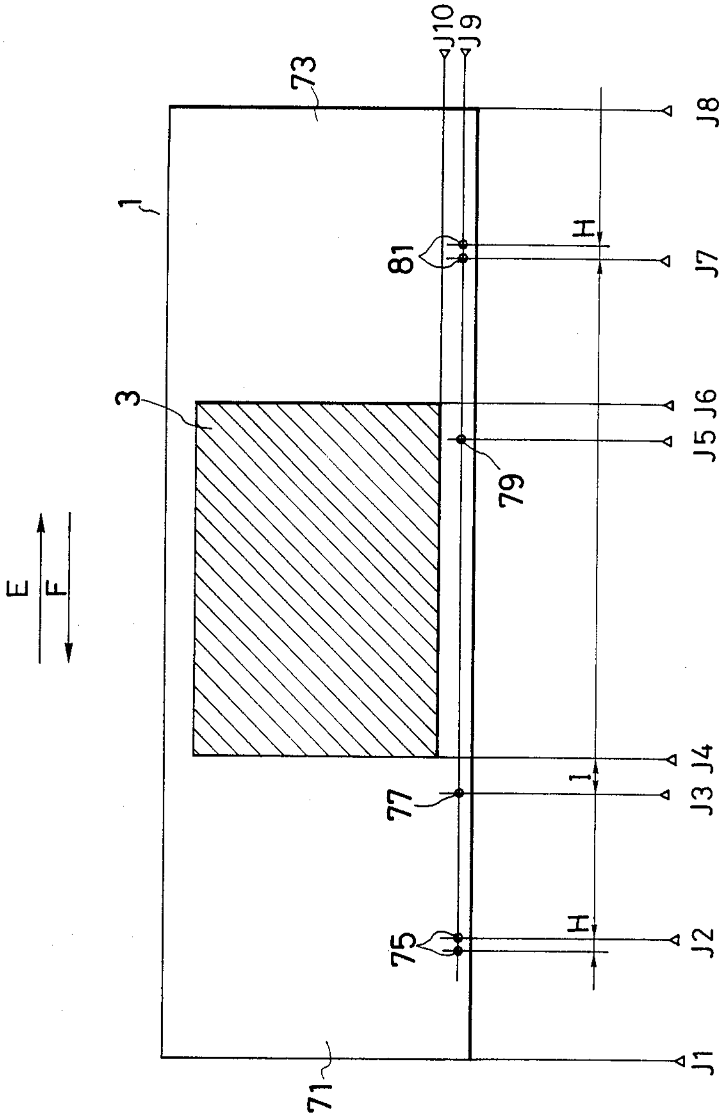
FIG. 6 and FIG. 7 are block diagrams for the film.
Figure 7:
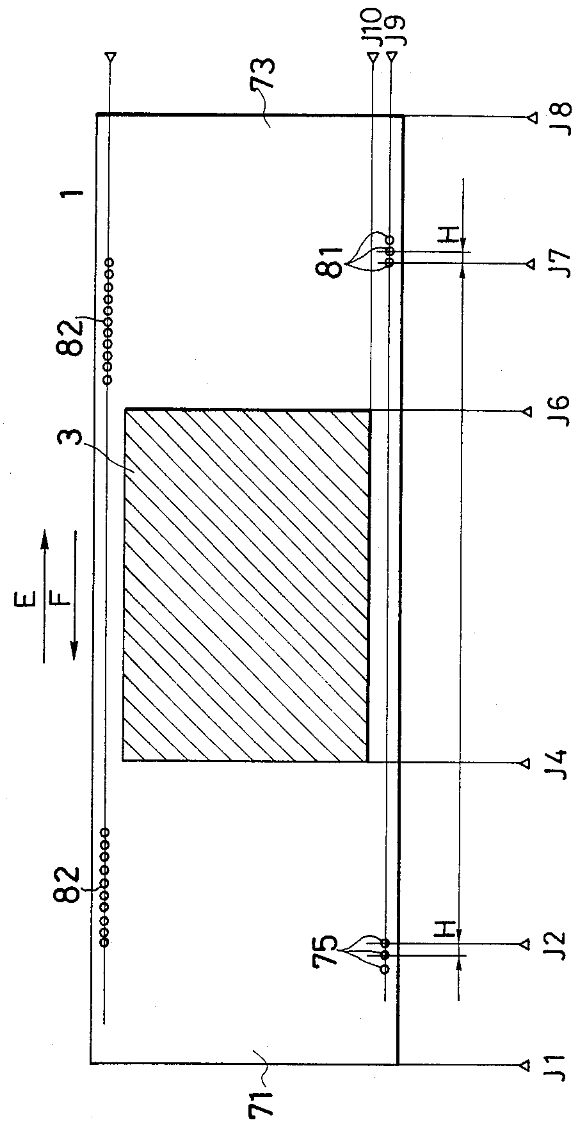

FIGS. 6 and 7 shows examples of configuration of the film 1.

In the figures, the left side where there is not formed multi-orifice portion 3 is called the left base part 71, and the right side is called the right base part 73. The position detection holes 75, 77, 79 and 81 are the holes that are provided on the end side J9 of the film 1 for detecting the film position by the film detection fibers 61 and 62.

The first position detection hole 75 on left side is for indicating the completion of transportation of the film when the film is transported in the E direction, and the first position detection hole 81 on right side is a corresponding hole when the film is transported in the F direction. The second position detection hole 77 on left side is for indicating the print start position when the film is transported in the E direction and the print completion position when it is transported in the F direction. In addition, the second position detection hole 79 on right side is for indicating the print start position when the film 1 is transported in the F direction and the print completion position in the E direction.

Further, the points J1 to J8 show the positions of the position holes and the numerous orifices. The point Jl shows the left edge portion of the film 1, J2 the first position detection hole 75 on left side, J3 the second position detection hole 77 on left side, J4 the left edge portion of the multi-orifice portion 3, J5 the second position detection hole 79 on right side, J6 the right edge portion of the multi-orifice portion 3, J7 the second detection hole 81 on right side, and J8 the right edge portion of the film 1.

The position detection holes 75 and 81 have a plurality of holes that have a pitch of H. The pitch of the holes H is equal to the distance G between the film position detection fibers 61 and 62.

Accordingly, if the portions other than those of the position detection holes 75 to 81 are at the positions of the points K2 and K3, the photosensors 63 and 65 are turned on by the reflected light from the film 1. On the other hand, if the position detection holes are at the positions of the points K2 and K3, the outputs of the corresponding photosensors 63 and 65 are in the off-state, and the detection of the position detection holes is carried out.

When the first position detection holes 75 and 81 come to the points K2 and K3, the output of both of the photosensors becomes off-state. However, the outputs of the photosensors 63 and 65 will not be in off-state simultaneously since the second position detection holes 77 and 81 are single holes individually. The drive control of the film 1 is carried out by detecting the film detection holes in the above fashion.

On the other hand, in the film configuration example shown in FIG. 7, there are provided a plurality of moving detection holes 82 of a predetermined spacing on the film end portions which face the position detection holes 75 and 81. The drive control of the film 1 is carried out as will be described later by detecting the moving detection holes 82 with a film motion detection sensor 66.

Structure of the Thermal Head

Figure 8:
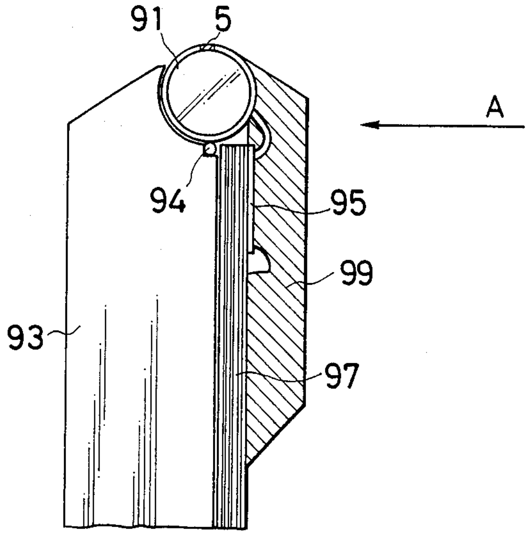
FIGS. 8 and 9 are overall block diagrams of the thermal head.
Figure 9:
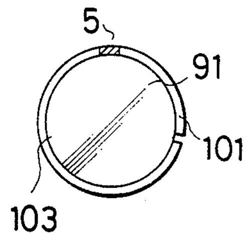
Figure 10:
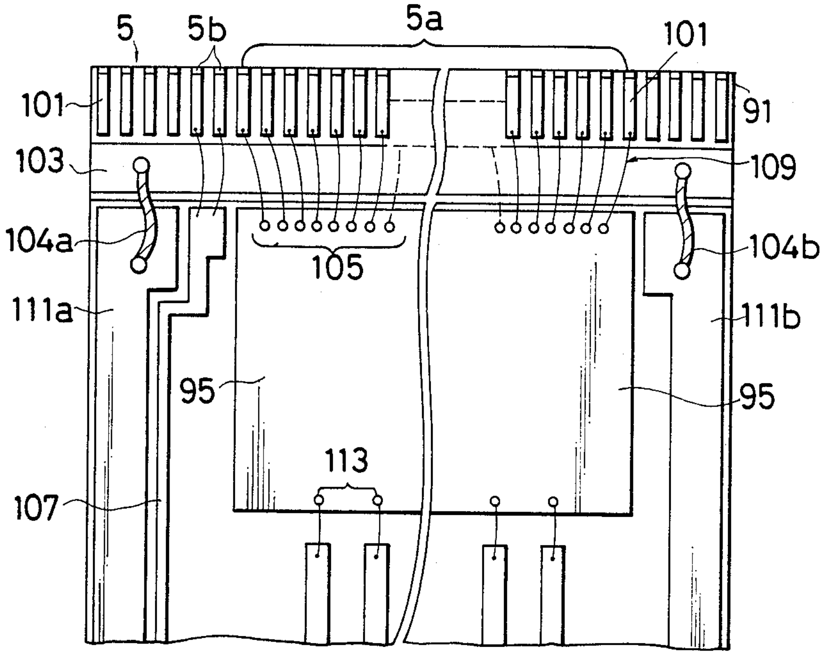
FIG. 10 is an overall block diagram of the thermal head as seen from the direction of the arrow A in FIG. 9(A)

Shown in FIGS. 8 and 9 are an overall cross section and a cross section of the rod portion of the thermal head 35, shown in FIG. 10 is a side view from the direction of the arrow A in FIG. 8.

The thermal head 35 includes a metallic rod 91 on which are formed numerous heating elements 5, a supporting member 93 made of aluminum which supports the rod 91 as well as radiates heat of the rod 91, a thermistor 94 that makes contact with the lower part of the rod 91, for detecting the temperature of the thermal head 35, and a PC plate 97 that is joined to the surface of the supporting member 93 for mounting LSI 95 that drive the heating elements 5. The driving LSI's 95 are covered with a protective layer 99 made of epoxy resin.

In addition, as shown in FIG. 9, there are formed on the rod 91 an electrode pattern 101 on driving side and an electrode pattern 103 on common side, of the heating elements 5.

The heating elements 5 that are formed in large number on the rod 91 consist of, as shown in FIG. 10, the heating elements (effective heating elements) 5*a* that are used for actual printing and the heating elements (heating elements for control) 5*b* that are used for feedback control of the printing conditions.

The electrode pattern 101 on driving side of each of the effective heating elements 5*a* is connected to the corresponding output signal pad 105 of the driving LSI 95, and the electrode pattern 101 on driving side of the heating elements for control 5*b* is connected to the heating element lead-out pattern for control 107, respectively with bonding wires 109. Further, the electrode pattern on common side 103 of the heating elements 5 (5*a* and 5*b*) is connected to the driving power supply patterns 111*a* and 111*b* that are formed on both sides of the head unit, by common lead lines 104*a* and 104*b*.

A driving LSI 95 of the present embodiment has 32 of the output signal pad 105, and is driven by time division at 32-bit unit as will be described later. In addition, the number of driving LSI's 95 used is 54, and the number of effective heating elements 5*a* is 1,728.

Consequently, the effective heating elements 5*a* are driven by time division at a unit of 32-bit so that the current that flows in the electrode pattern on common side 103 is considerably smaller than that in the thermal head which is widely in use ordinarily. Therefore, it is possible to prevent inconveniences due to voltage drop, heating of electrodes, and so forth.

Internal Circuit of the Thermal Head

Figure 11:
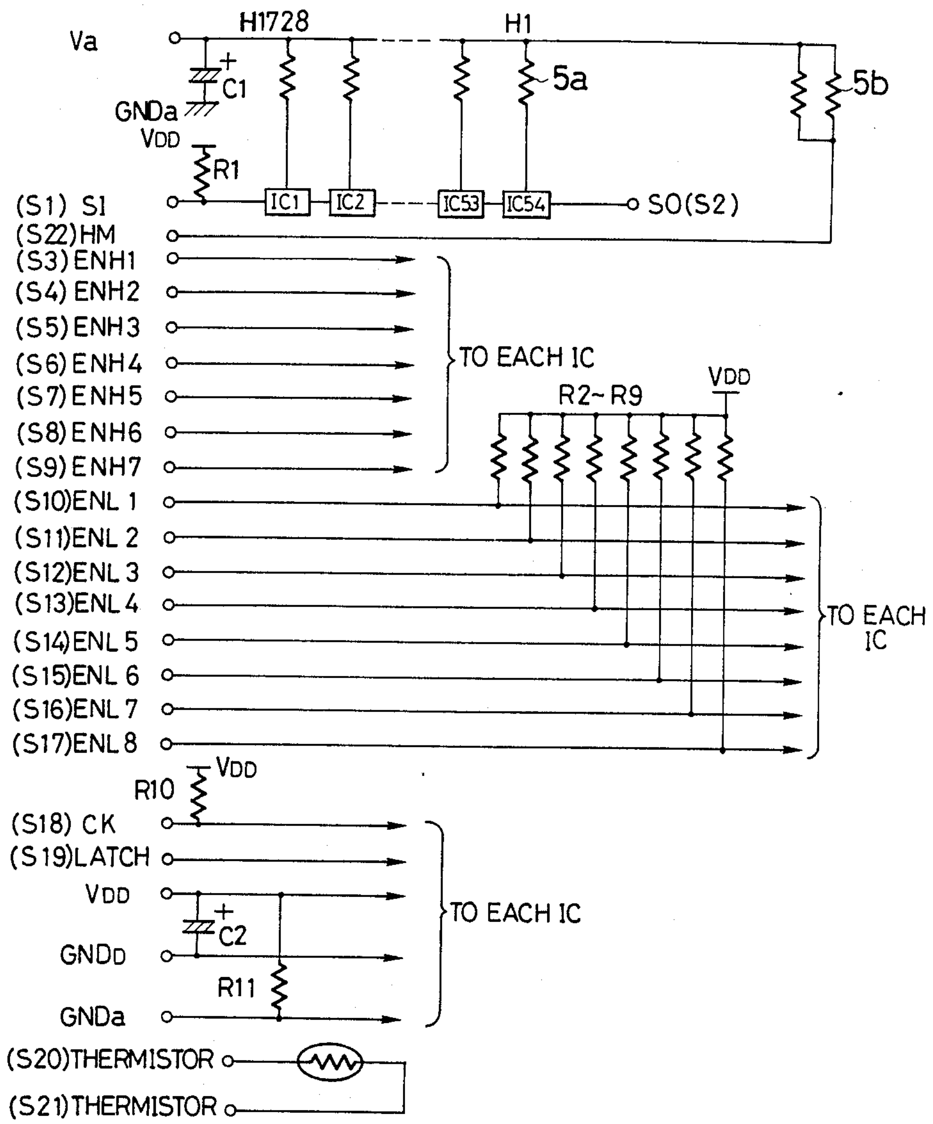
FIG. 11 is a diagram which illustrates the internal circuit of the thermal head along with the time division driving signals.

In FIG. 11 is shown the internal circuit of the thermal head 35.

To the entire heating elements (Hl to H1728) of the effective heating elements 5*a* is supplied a driving supply voltage (+24V) Va from a power supply unit 191 that will be described later. In addition, each of the effective heating elements 5*a* is connected to each of the output terminals of the corresponding driving LSI (IC1 to IC54) as mentioned earlier.

To the serial input (SI) terminal of IC1 there is supplied a serial input data signal SI, and the serial output (SO) terminal of IC1 is connected to the SI terminal of the next IC2. In this way, IC1 to IC54 are connected in series so that a printing data that is input to the SI terminal of IC1 is shifted successively to IC54.

Namely, a serial printing data which is input synchronized with the shift clock (CK) S18 that will be described later, is held in the shift register within IC1 to IC54, a latch signal S19 is supplied on completion of input of the serial printing data, and is latched in each latch within IC1 to IC54. From latch data, one IC is selected successively from among IC1 to IC54 by the time division driving signals ENH1 to ENH7 (S3 to S9) and ENL1 to ENL8 (S10 to S17), and in this way, the effective heating elements 5*a* are driven by time division at a unit of 32-bits.

Relationship between A Host-Side System and the Present Apparatus

Figure 12:
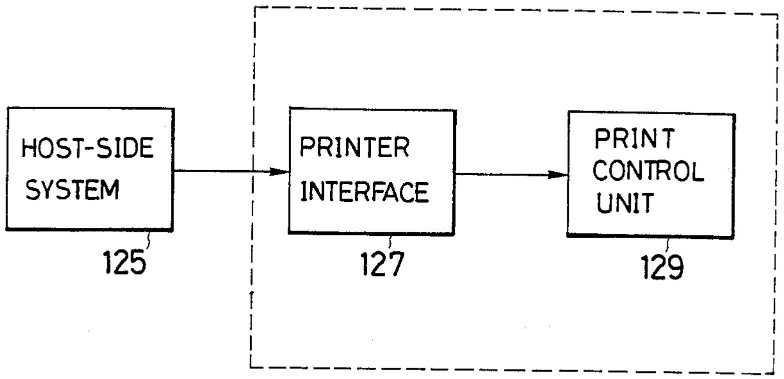
FIG. 12 is a block diagram which shows the relation between the host side system and the recording apparatus.

In FIG. 12 is shown the relationship between a host-side system and the present apparatus.

The host-side system 125 may be, for example, an office computer which sends out a printing data and a command data to a printer interface 127. Upon receipt of a command data, the printer interface 127 sets up the printing mode for the print control unit 129.

The printing data includes character data and bit image data. The character data is sent out, after it is developed into a bit image for the character by a character generator in the printer interface 127, to the print control unit 129. The bit image data, on the other hand, is sent out to the print control unit 129 as it is.

Configuration and Operation of the Printer Interface

Figure 13:
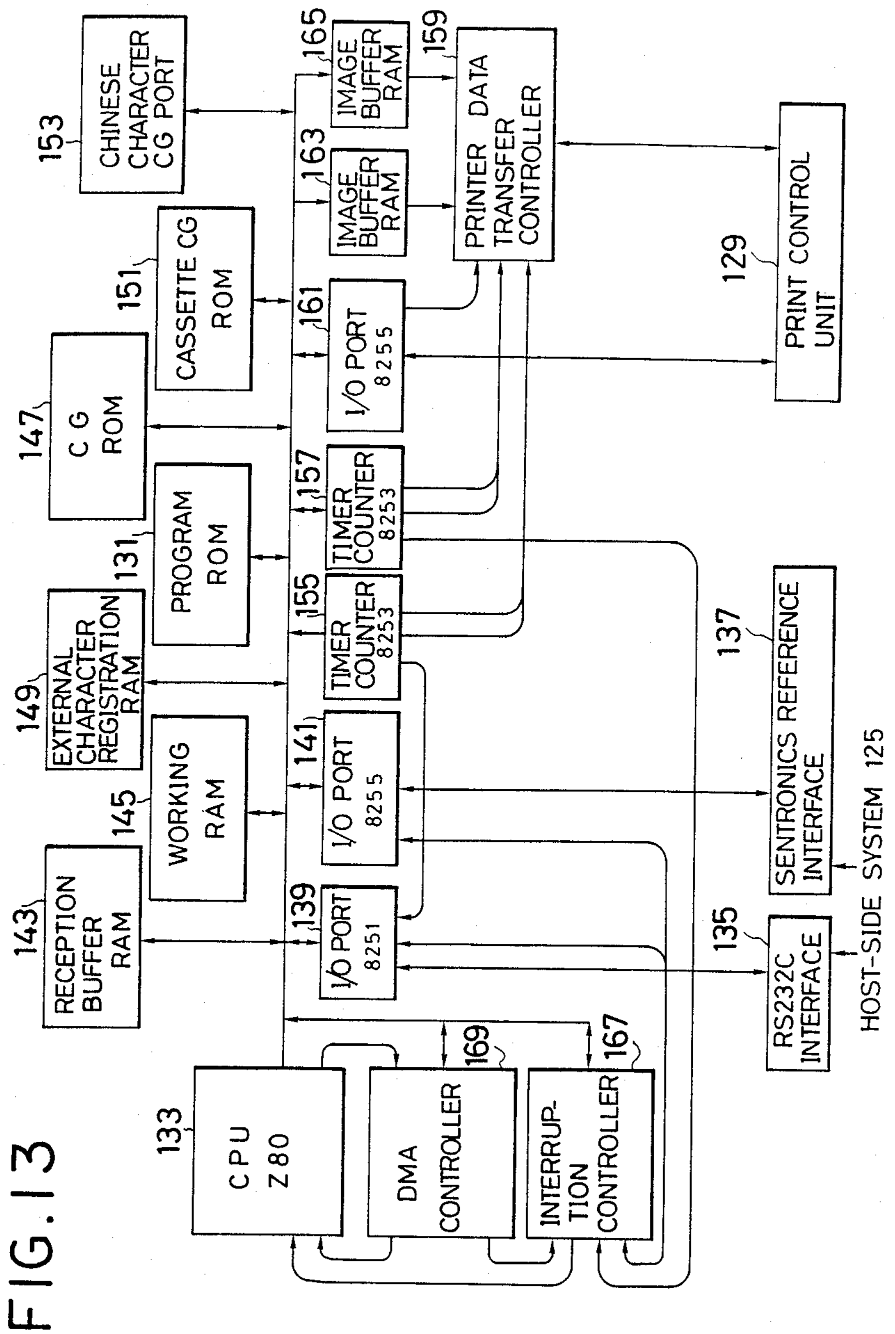
FIG. 13 is a block diagram which shows the configuration of the printer interface.

In FIG. 13 is shown the configuration of the printer interface 127.

The printer interface 127 is controlled by a microprocessor (CPU) 133 according to a control program that is housed in a program ROM 131.

The data (printing data and command data) from the host-side system 125 is input via the interfaces 135 and 137. The interface 135 is a general purpose serial interface and use is made, for instance, of RS-232C. In addition, the interface 137 is a general purpose parallel interface according to Sentronics. Further, serial communication control is carried out by an input-output port 139, and parallel communication control is carried out by an input-output port 141.

An input data is stored temporarily in a reception buffer RAM 143. When the input data is a character, the data in the reception buffer RAM 143 is developed into a bit image by using a working RAM 145.

In a character generating ROM (CGROM) 147 there are stored character patterns that are equipped typically. In using a character which is not stored in CGROM 147, a character pattern loaded from the host-side system 125 is stored in an outside character registering RAM149. A cassette CGROM151 is a freely attachable and detachable ROM which stores character patterns other than those in the CGROM147. In Chinese character CG board 153 there are stored Chinese character patterns of mainly first and second JIS levels.

Timer-counters 155 and 157 are programmable counters which carry out various kinds of time control and counter control for a reference clock to the input-output port 139 for serial communication and for a printer data transfer controller 159.

Parallel I/O port 161 carries out transmission and reception of control signals between the print data transfer controller 159 and the print control unit 129.

In the two image buffers RAM163 and 165, bit image data is stored temporarily, and they are used alternately when transmitting data to the print control unit 129.

The print data transfer controller 159 carries out control in transmitting data to the print control unit 129.

Configuration of the Print Control Unit

Figure 14:
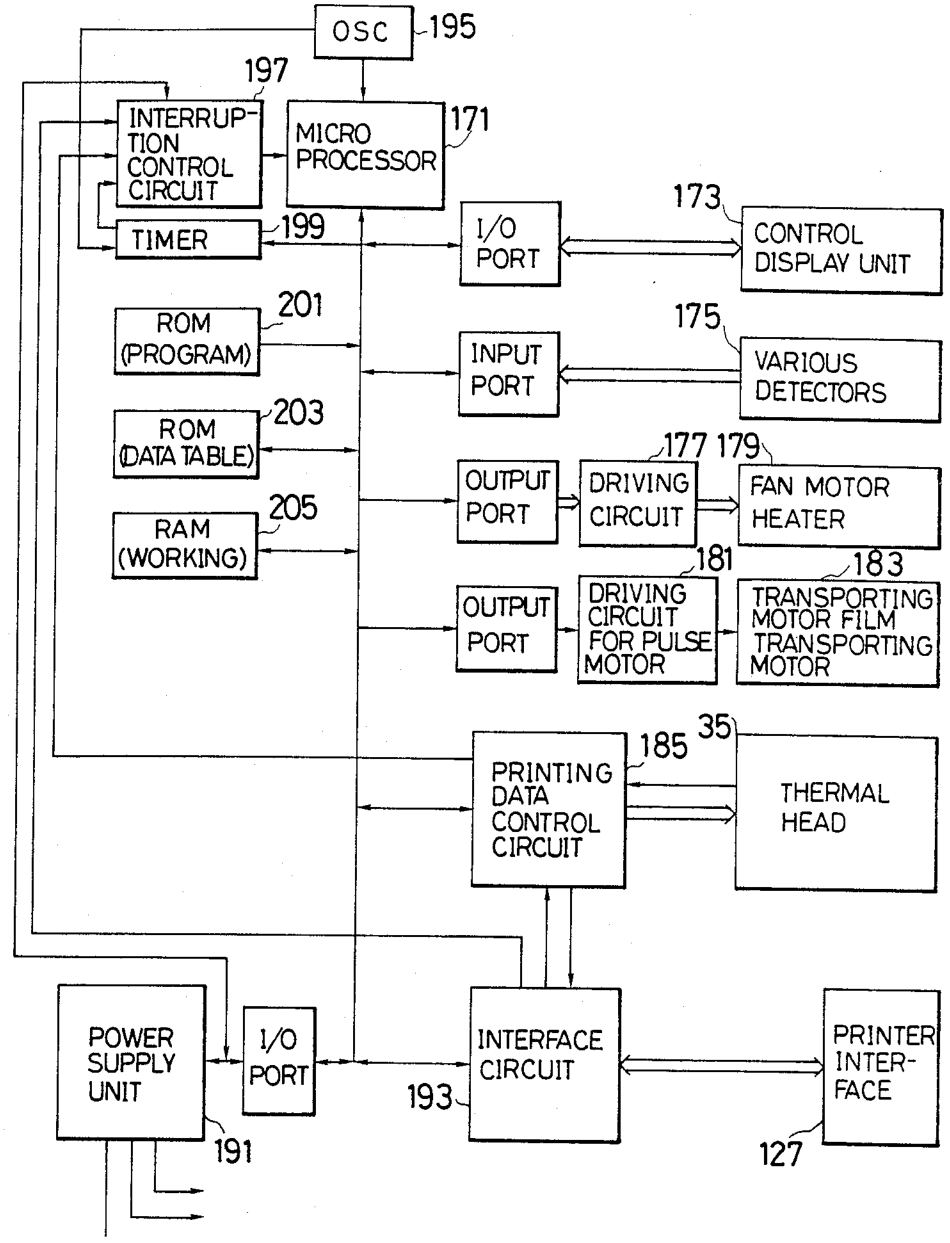
FIG. 14 is a block diagram which shows the configuration of the print control unit.

FIG. 14 shows the configuration of the print control unit 129.

The print control unit 129 is constructed with the microprocessor 171 as the control center. Its input-output ports are connected to a control display unit 173 that is provided with control keys and lamps for displaying the operational conditions, various detectors 175, a fan motor and a heater 179 via a driving circuit 177, a pulse motor for transporting recording paper and a film transporting pulse motor 183, via a pulse motor driving circuit 181, a printing data control circuit 185, and the printer interface 127, via a power supply unit 191 and an interface circuit 193.

In addition, the print control unit 129 includes an oscillator (OSC) 195 which generates reference clocks that are supplied to various timer circuits, microprocessor 171, and others within the print control unit 129, an interruption control circuit 197 which controls the demands for interruption that come from the printing data control circuit 185, the interface circuit 193, a timer 199, and others, a program timer 199 with a plurality of channels that control the mechanical timings (for paper feeding, paper check, and various kinds of motors) of the print control unit 129, a ROM201 with built-in control program, a ROM 203 for data table with built-in timing data of various kinds, and a working RAM205.

In the following, the components of the print control unit 129 mentioned above will be described in detail.

Configuration of Various Kinds of Detectors

Figure 15:
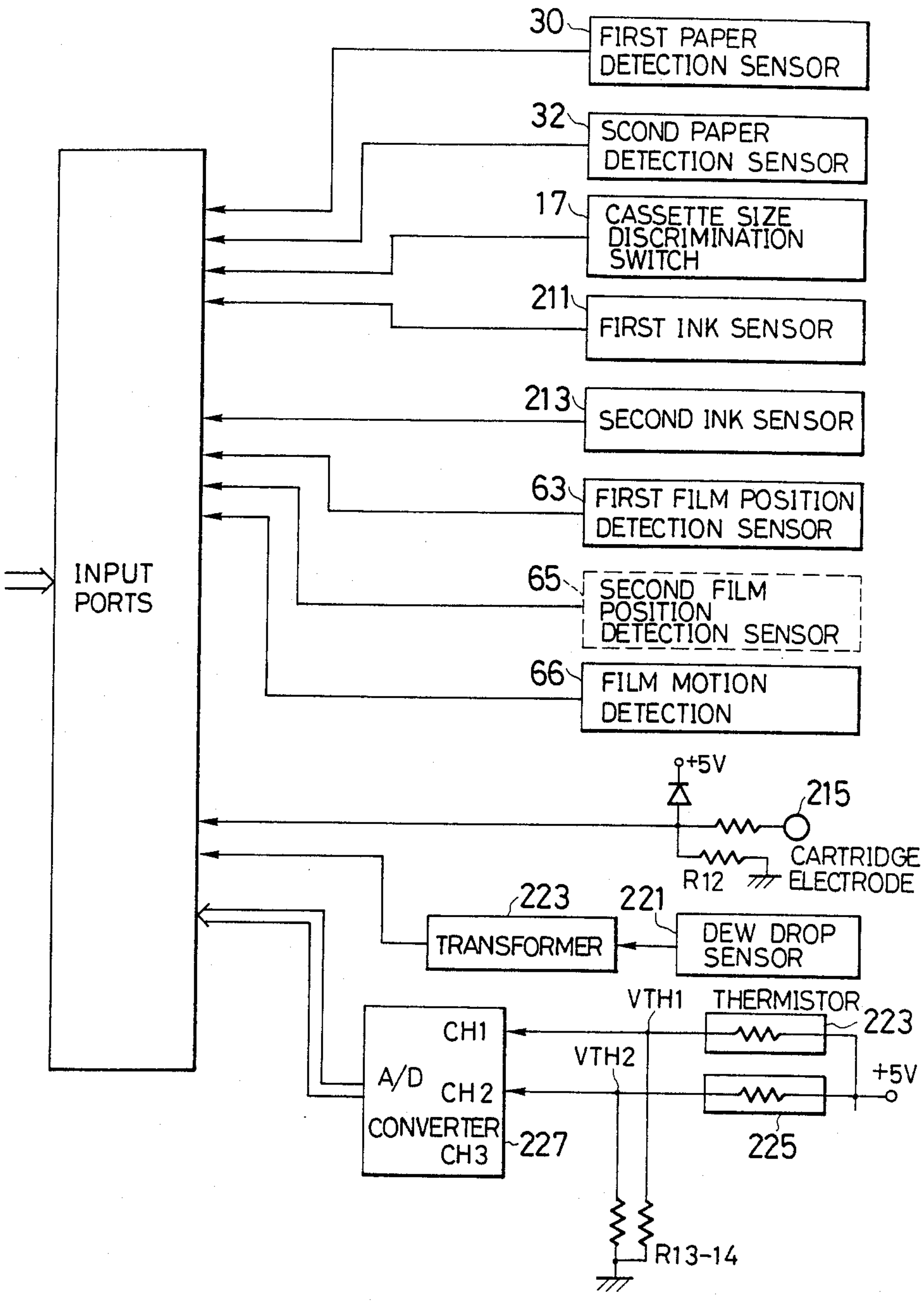
FIG. 15 is a block diagram which shows the configuration of each detector in FIG. 14.

FIG. 15 shows the various kinds of detectors 175.

The first paper detector 30 is a sensor consisting of a light-emitting element and a light-receiving element which is provided in front of the regist roller 33 in order to detect the recording paper 7 that is sent, as shown in FIG. 1.

The second paper detector 32 is a sensor which consists of a light-emitting element and a light-receiving element that is provided immediately after the paper ejecting roller 37 in order to detect whether or not the printed recording paper 7 is ejected normally from the paper ejecting roller 37.

The cassette size discrimination switch 17 is a switch to discriminate the cassette size as mentioned earlier.

A first ink sensor 211 and a second ink sensor 213 are switches for detecting the quantity of recording ink in an ink container 215, each consisting of a light-emitting element and a light-receiving element.

An ink cartridge electrode 215 is mounted to make contact with the paper winding shaft 49 or 51 of the film 1, and is used for detecting the electrically connected state due to rupture of a protective film on the heating elements 5. Namely, in this state, the driving voltage for the thermal head 35 is applied to the film 1, and the same voltage is applied also to the electrode 215. This applied voltage is supplied to the input port as a detected signal, by flowing out via a resistor R12. The microcomputer 171 stops the driving of the thermal head 35 by receiving the detected signal.

Accordingly, if the heating elements 5 are brought to a connected state with the film 1 due to puncture of its protective film, it can be detected immediately and the driving of the thermal head 35 can be brought to a stop. Therefore, there will be no fear of having puncture of the film 1 or burning of the apparatus as a whole that may be caused by the fracture of the protective film, and the safety of the apparatus can be secured.

Further, the case of the film cartridge 43 is formed with a nonconductive member and house is insulated from the casing of the apparatus body. Therefore, even if a voltage is applied to the film 1, differing from the case of an ordinary recording apparatus in which the grand line of the signal system is connected to the casing, there will not flow a short-circuit current between the casing of the apparatus and the power supply line, which can secure the prevention of electrification, burning of film, and burning of the parts in the apparatus.

A dew drop sensor 221 makes contact with an ink supply member 53 as shown in FIG. 5 and is mounted at a position which is farthest from the ink container 215.

Configuration and Operation of the Printing Data Control Circuit

Figure 16:
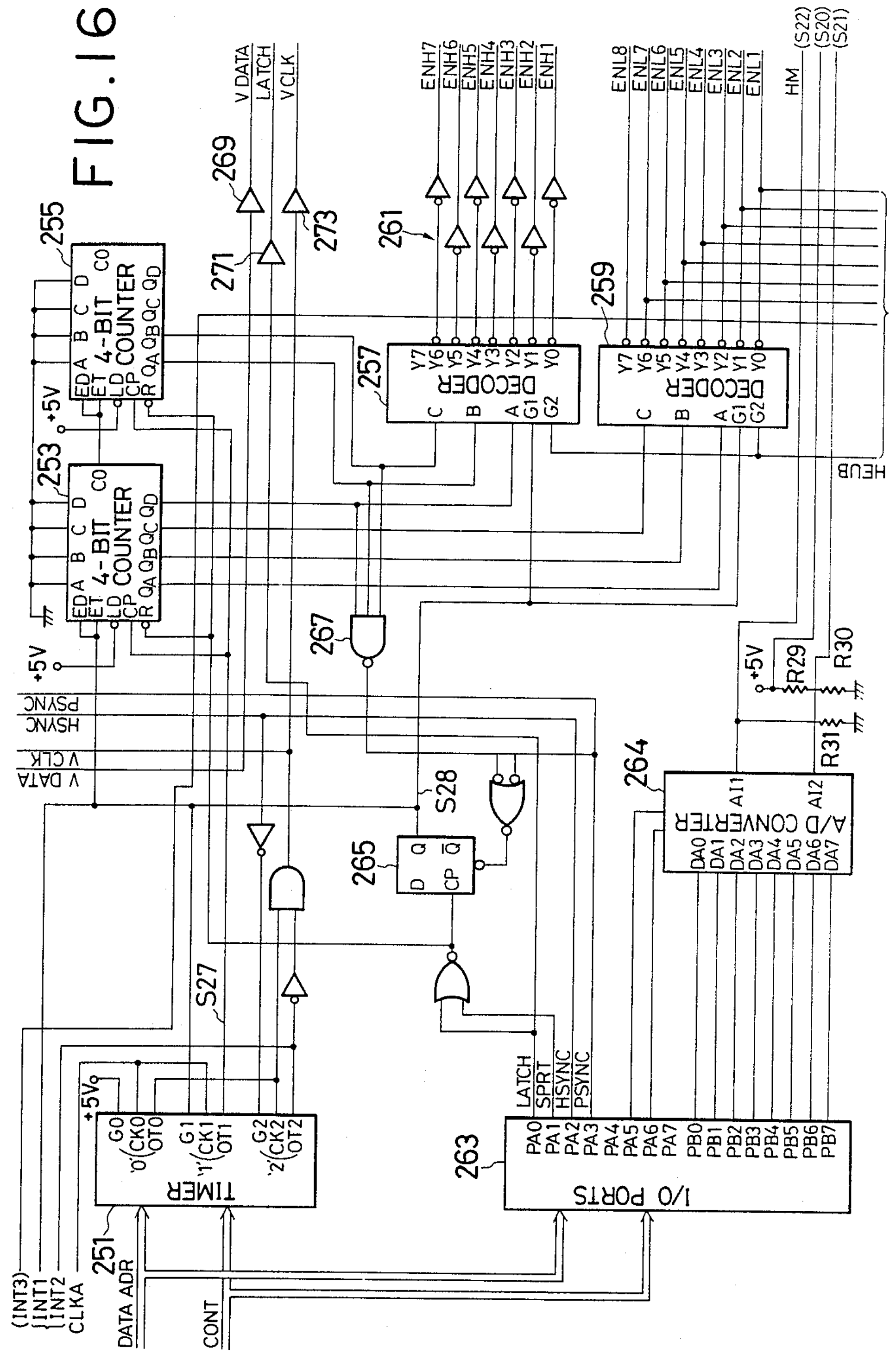
FIG. 16 is a block diagram which shows the configuration of the printing data control circuit.

In FIG. 16, the timer 251 is a timer (825 made by Intel Co.) which has three built-in timer circuits. Timer "0" of the timer is used for generating video clocks (corresponding to the transfer of one picture element) VCLK during printing operation. Timer "1" is used to obtain fundamental driving pulses ENL1 to ENL8 during time division driving of the thermal head. Timer "2" is used for controlling the send out number of one line of the video clocks VCLK. The 4-bit counters 253 and 255 are counters (corresponding to LS117 of Texas Instruments) which count the driving fundamental pulses S27, and generate time division driving control signals ENL1 to ENL8 and ENH1 to ENH7.

Decoders 257 and 259 decode outputs of the counters 253 and 255, and send out the time division driving control signals ENL1 to ENL8 and ENH1 to ENH7 to the thermal head 35 via inverters 261 that are provided separately. In addition, the outputs are sent out also to the thermal head protection check circuit 262 where check on the pulse width is carried out. When an abnormality is detected as a result of the pulse width check, head enable signal HENB becomes "L" level and the outputs of the decoders 257 and 259 both become "H" level, so that the driving of the thermal head 35 is brought to a stop instantly.

The port output PA0 of the input-output port 263 is a signal LATCH output for latching the data that are sent out serially to the output latch in the thermal head, port output PA1 is a trigger signal SPRT output for driving again the time division driving signal which is done in printing one line for two times in order to enhance the printing density, and port output PA2 is the horizontally synchronized signal (line synchronization signal) HSYNC in printing one line, and port output PA3 is the page synchronization signal PSYNC for one sheet of paper.

Flip-flop 265 is for controlling the output enable in the case of printing one line, which is operated so as to output an enable signal for once in the case of single printing and for twice in case of double printings. The flip-flop 265 is set by the latch signal and the trigger signal SPRT, and is reset when the counters 251 and 253 are counted up and the inputs of the gate 267 become all "1".

To the thermal head 35, time division driving control signals ENL1 to ENL8 and ENH1 to ENH8, video clock signal VCLK, output latch signal LATCH, and video data signal VDATA are sent via output buffers 269, 271, and 273.

In addition, to the interface cirucuit 193, there are sent the page synchronization signal PSYNC, line synchronization signal HSYNC, and video clock signal VCLK, and from the interface circuit 193, there is sent out a video data VDATA synchronized with the video clock signal VCLK by the printer interface 127.

Figure 17:
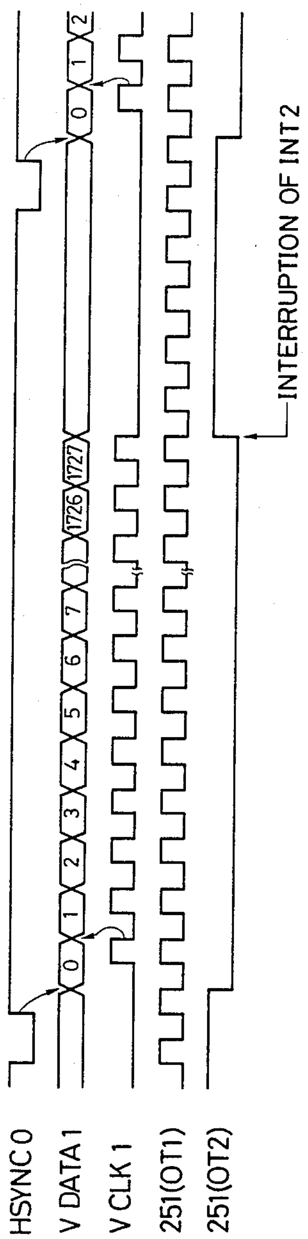
FIG. 17 and FIG. 18 are time charts which show the relationship between various kinds of signals of the printing data control circuit.

In FIG. 17 is shown the relationship among the line synchronization signal HSYNC, video data signal VDATA, and the output signals of OT1 and OT2 of the timer 212, of FIG. 16.

Figure 18:
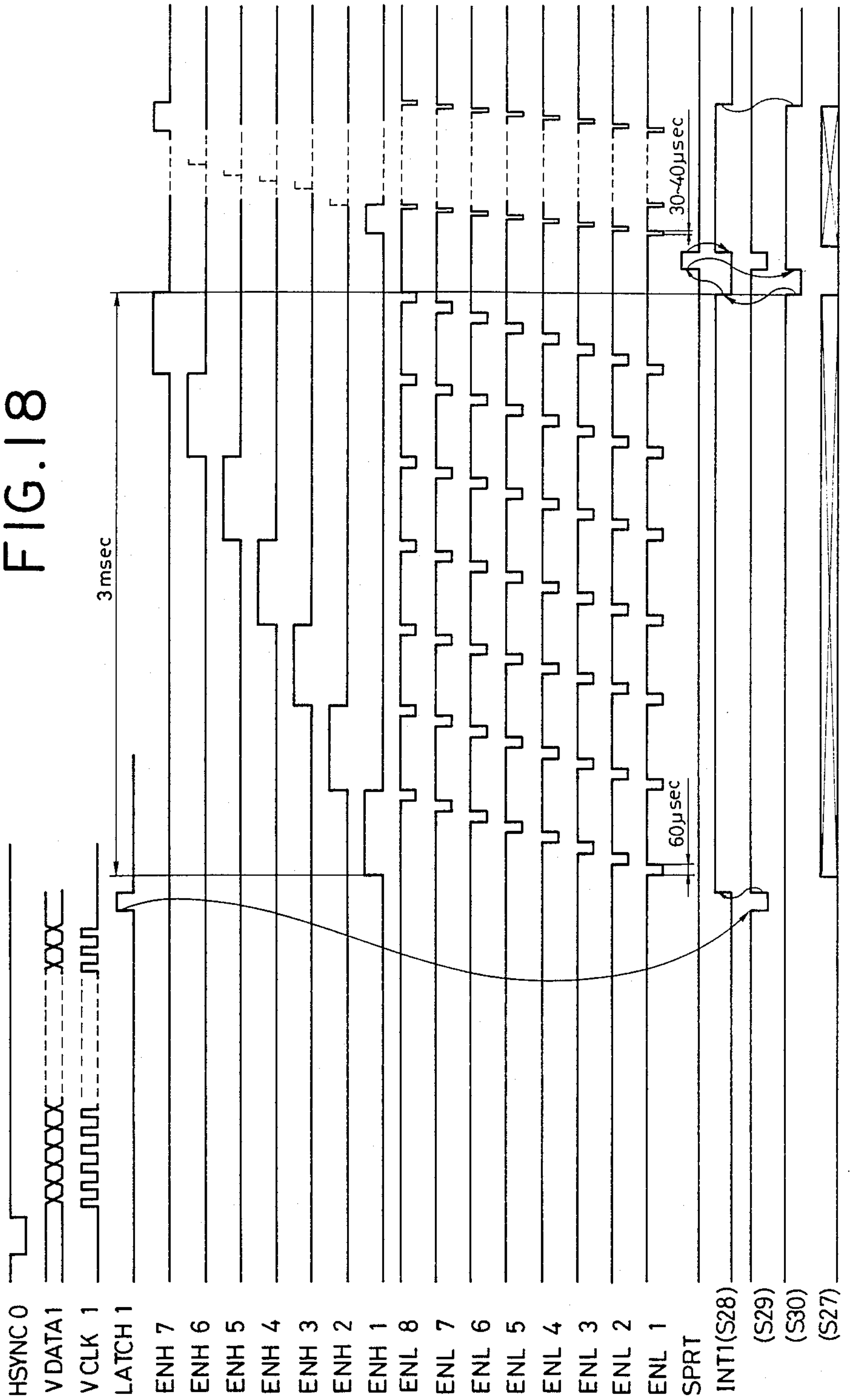

In FIG. 18 is a timing chart that shows the relationship among the line synchronization signal HSYNC, video data signal VDATA, video clock signal VCLK, latch signal LATCH, time division driving control signals ENL1 to ENL8 and ENH1 to ENH7, double printing control signal (trigger signal) SPRT, output INT1 (S28) of output enable control flip-flop 265, and so on of FIG. 16. It shows the operational timings for the case of carrying out printing twice for one line (double printing).

When single printing is designated from the printer interface 127, trigger signal SPRT is not output so that the head 35 is driven for only once. Further, to the interruption control circuit 197 is connected the output S28 of the FF265 for output control enable and the output of the timer 251 (OT2) for controlling the sending number of one line.

The flip-flop 265 is used for controlling the double printing. Namely, when the drive for the first time is completed, the flip-flop 265 is reset. By the change in the output, the microprocessor 171 is interrupted, and the microprocessor 171 outputs a trigger signal SPRT which is the signal for starting a second drive, on the output port 213 (PA1).

The timer 251 is used for controlling the time division driving of the head 35 after the latching operation. Namely, the microprocessor 171 is interrupted by the change in the output of the timer 251 (OT2), and the microprocessor outputs a latch pulse LATCH to the output port 263. Thereafter, driving operation of the head by time division will take place.

Configuration and Operation of the Interface Circuit 193

Figure 19:
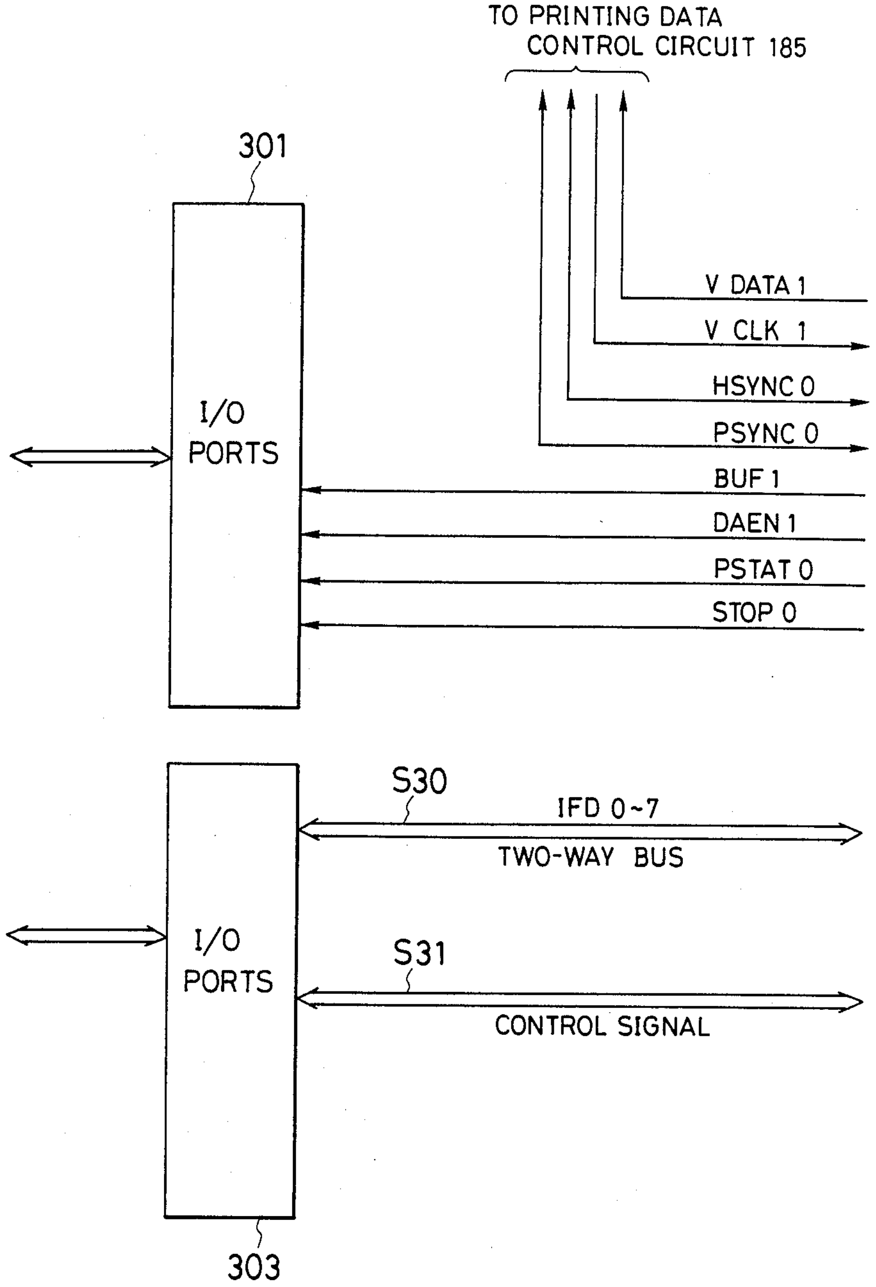
FIG. 19 is a block diagram which shows the configuration of the interface circuit.

FIG. 19 shows details of the interface circuit 193 in FIG. 14. The interface circuit 193 is a circuit for exchanging the printing data, control command/status data, and so forth between the printer interface 127.

In FIG. 19, 301 is an input-output port for transferring signals used for transfer control of the printing data, and 303 is a port for transferring mainly the command/status data. In addition, four signals, namely, the video data signal VDATAl, video clock signal VCLK1, line synchronization signal HSYNC0, and page synchronization signal PSYNC0, are connected to the printing data control circuit 185. BUF1 signal is a signal which is used in transferring the printing data from the printer interface unit 127. When this signal is "1", it signifies that preparation is complete for the transfer of the printing data block. DAEN1 indicates that the data which is now being sent out is an effective data (data that is to be printed on the recording paper). PSTAT0 signal is a start signal for one page of printing, and STOP0 signal is used for halting temporarily the printing operation from the printer interface 127. IFD0 to IFD7 (S30) are two-way balances for command and status data and S31 is a control signal line for data strobe, busy signal, and others.

Configuration of Power Supply Unit

Figure 20:
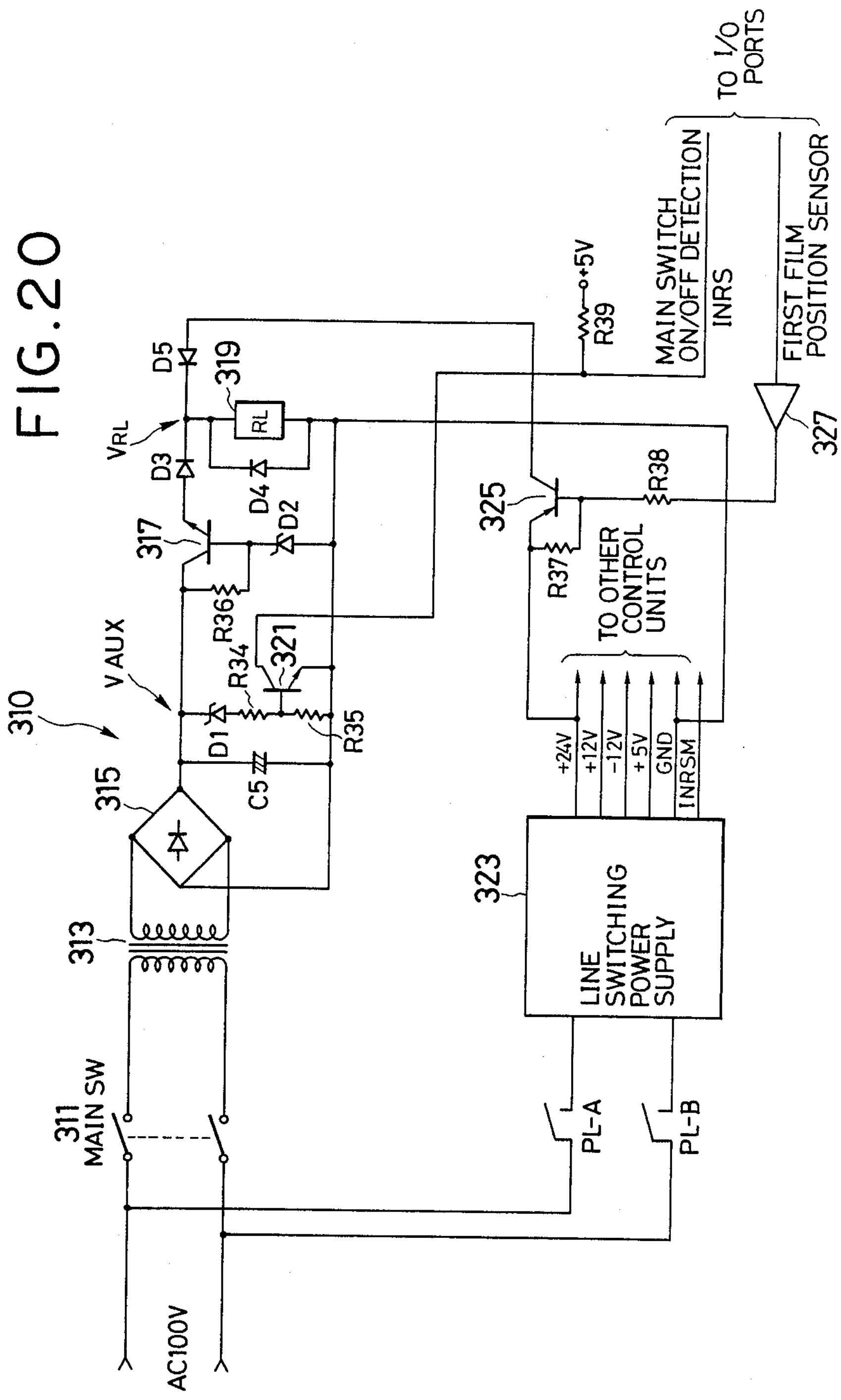
FIG. 20 is a diagram which shows the configuration of the power supply unit.

FIG. 20 shows the power supply unit 191. The power supply unit 191 includes an auxiliary power supply 310 and a main power supply (line switching power supply) 323.

On the high voltage side of a step-down transformer 31 of the auxiliary power supply 310 is connected via a main switch 311 to the commercial power supply (AC 100V), and on the low voltage side, AC voltage that is stepped down in rectified and smoothed via a diode bridge 315 and a capacitor C5.

The smoothed DC voltage, that is, the auxiliary supply voltage Vaux, is kept at 24V by a transistor for regulator 317 and a Zener diode D2 of 24V. Further, a voltage drop in the auxiliary supply voltage Vaux is sensed by a diode Dl and ON/OFF of the auxiliary power supply 310 is sensed by a transistor 321.

The auxiliary supply voltage Vaux of 24V is applied to a power relay 319 which controls the ON/OFF of the main power supply 323 as will be described later. Further, diode D3 is a diode for preventing the mixing of current in the auxiliary power supply 310 during supply of 24V by the main power supply 323, diode D4 is a diode for killing the sparks in the power relay 319, and diode D5 is a diode for preventing the mixing of current from the auxiliary power supply 310 to the main power supply 323.

To a line switching power supply 323 which becomes the main supply, there is input the commercial supply voltage via make contact RL-A and RL-B of the power relay 319, and from the power supply 323 there are output voltages +24V, +12V, −12V, and +15V and main initial signal INRSM which becomes the initialization signal for the microprocessor 171 and various kinds of control circuit.

The output voltage is supplied to the power relay 319 via a transistor 325 which controls ON/OFF of the power relay 319. In addition, the ON/OFF of the transistor 325 is controled by the film position detection signal from the first film position detection sensor which is supplied via a drive buffer 327.

Operation of the Power Supply Unit

Figure 21:
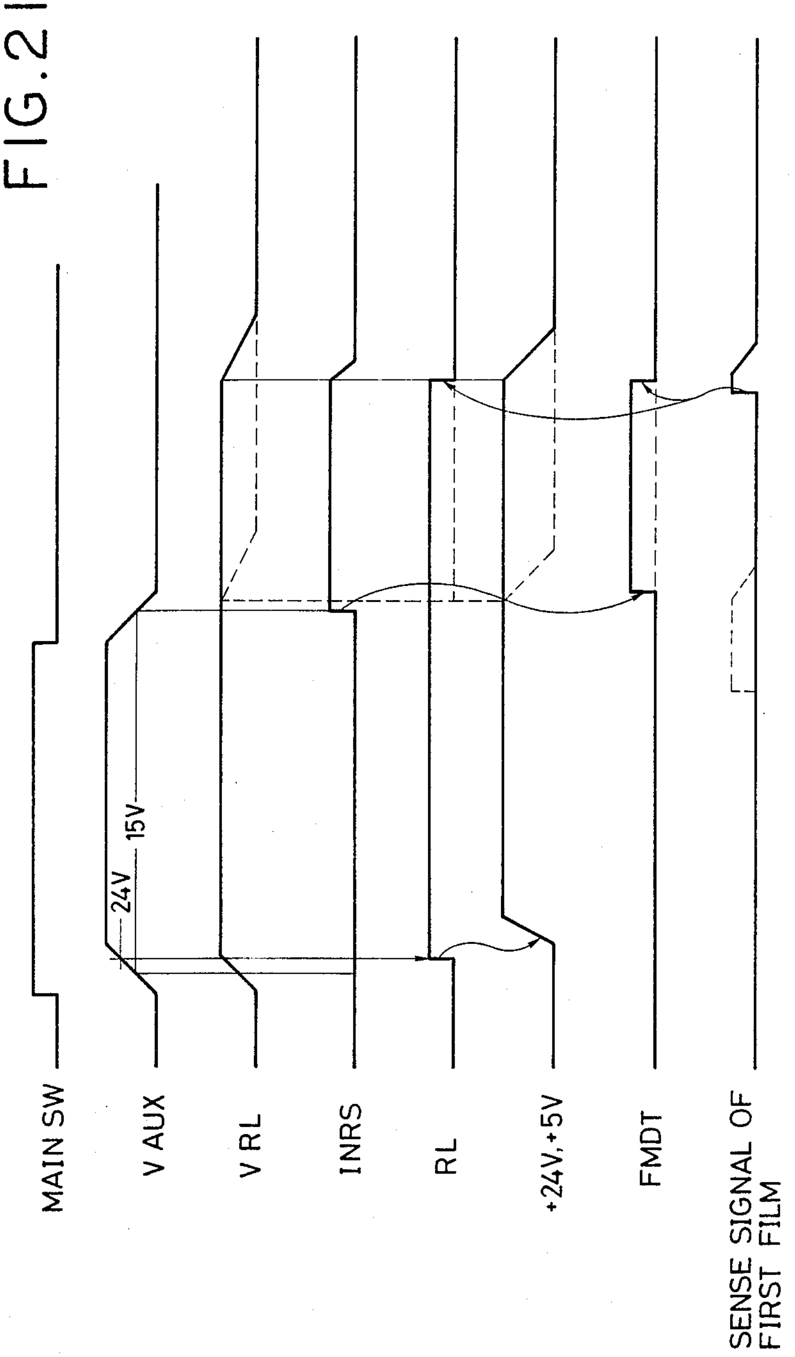
FIG. 21 is a time chart for explaining the operation of the power supply unit.

In FIG. 21 is shown a timing chart for the ON/OFF of the power supply of the power supply unit 191.

When the main switch 311 is closed, the auxiliary power supply 310 is turned on. When the auxiliary supply voltage Vaux and the impressed voltage VRL to the power relay 319 become about 24V, the relay 319 is actuated and the relay contacts RL-A and RL-B are closed. In this way, the commercial supply voltage AC 100V is applied to the main power supply 323 and the operation is started.

From the main power supply 323, the various voltages are output and also the main initial signal INRSM is output for a predetermined length of time. By the signal INRSM, the microprocessor 171 and other control circuits are initialized.

When the main switch is opened, the auxiliary supply voltage Vaux decreases and when it becomes about 15V, the Zener diode D2 ceases to operate and the transistor 321 becomes off-state. With this, the initial reset signal INRS changes from "L" to "H" (+5V), and the closure of the main switch 311 is sensed by the microprocessor 171.

Here, voltage is impressed to the relay 319 from both of the auxiliary power supply and the main power supply by diodes D3 and D5, so that the relay will not be turned off even if the main switch is opened, and the main power source 323 continues to operate.

When the microprocessor 171 detects the disconnection of the auxiliary power supply, it performs the following control operations.

(i) When the film 1 is at the stopping position in the standby condition.

When the opening of the main switch 311 is detected by the interruption of the initial reset signal INRS, the microprocessor 171 checks the state of the first film sensor 63.

Since the film 1 is at the stopping position (then the film cartridge is in a tightly sealed state), output of the sensor 63 is in on-state. Accordingly, the microprocessor 171 does not carry out any control operation, and the power relay 319 is turned off and the main power supply 323 is disconnected.

(ii) When the film 1 is at a position other than the stopping position in the standby condition.

Since the film 1 is at a nonstopping position (the film cartridge is in a state which is not tightly closed), the output of the sensor 63 is in off-state. Consequently, the microprocessor 171 actuates the film drive motor 47 to transport the film 1. When the film position hole is detected by the first film sensor 63, the film drive motor 47 is brought to a stop. With this, the multi-orifice portion 3 of the film 1 is housed within the film cartridge and the cartridge is tightly closed. Then, the output of the buffer 327 becomes "H" level (open), the transistor 325 is turned off, the power relay 319 is turned off, and the main power supply 323 is disconnected.

(iii) During Printing

By an interruption demand from the power supply unit 191, the microprocessor 171 detects the opening of the main switch 311. However, the printing operation is not brought to a stop since it is in the state of printing. In other words, the printing operation when there comes in a demand for interruption will be continued as is, and the operation in (ii) above will be taken up at the point in time when the printing operation for one page is completed. The microprocessor 171 actuates the film drive motor 47 to transport the film 1 upon completion of printing. When the film position holes 75 and 85 are detected, the film drive motor 47 is brought to a stop, and the film cartridge is closed tightly. Only at that point the main power supply 323 is disconnected.

As described in the above, according to the power supply unit 191, when the main switch 311 is opened, the multi-orifice portion 3 of the film 1 is housed in the film cartridge, and the film 1 is brought to a stop in the state of tight closure of the film cartridge. Therefore, drying of the ink-filled film 1 and evaporation of ink from the cartridge can be prevented without fail.

Accordingly, even if the main switch 311 is opened unwittingly during printing, the main power supply 323 is disconnected after completion of one sheet of the recording paper 7, and the film cartridge is closed tightly. Therefore, printing can be accomplished surely, and misprints and ink evaporation can be prevented.

Moreover, the state of tight closure of the film cartridge can be released only by the signal for tarting print which comes from the print control unit so that the state of completely tight closure can be retained, and blinding of the film 1 due to drying of ink and evaporation of ink from the cartridge can be prevented.

Data Transfer between Printer Interface 127 and Print Control Unit 129 and Drive Control of Each Pulse Motor in Print Control Unit, during Character Printing The operation will be described by making reference to the timing chart shown in FIG. 22.

Upon receipt of a printing data from the host-side system, the printer interface 127 examines the state of the print control unit 129 by sending out a status command (SRl or SR2) corresponding to the printing conditions. After judging that the print control unit 129 is ready to print as a result, it sets printing conditions by sending out a command which designates the printing conditions, to the print control unit. Then, it shifts the print start signal PSTATl to "H" level.

Upon receipt of the print start signal PSTATl, the print control unit 129 causes to rotate the feed roller 13 by rotating the paper forwarding motor 19 in the reverse direction to take out a sheet of printing paper 7 from the cassette 9. The paper taken out is further transported toward the resist roller 33 by the feed roller 29. The tip of the paper transported is detected by the first paper detection sensor 30. The detected signal is supplied to the microprocessor 171.

After discriminating the detected signal, the microprocessor 171 sets the timer 199. By this, the paper is transported for a fixed length of time. After the above paper feeding operation, the tip of the paper is put in good order by the resist roller 33.

In parallel with the paper feeding operation in the above, the film 1 is transported to the printable position by the film drive motor 47. Namely, the film setting operation is started by the left film position hole 75 or right film position hole 81 in FIG. 8. FIG. 42 illustrates the situation by assuming that the whole thing started from the state in which the point J2 in FIG. 8 was detected by the first film sensor 63.

When the microprocessor 171 receives a print start signal PSTAT 1, it sends out a pulse motor drive pulse in order to rotate the film drive motor 47 in the forward direction. In this case, by setting the timer 199 that controls the speed of rotation of the pulse motor to a timer value which corresponds to the fast mode, the film drive motor 47 is rotated in the positive direction with the speed of rotation of "1" (high speed).

Here, the film send-out counter provided in the working RAM 205 in FIG. 14 counts up "1" every time when one pulse motor driving pulse is sent out. Consequently, the pulse motor driving pulse is sent out until the counted value coincides with the pulse number NA up to the point J4, which is stored in the ROM 203 (data table). When the counted value reaches NA, the film drive motor 47 is brought to a stop when the multi-orifice portion 3 of the film 1 finds itself situated above the thermal head 35.

When the paper feeding operation for the recording paper 7 in the above is completed, a page synchronization signal PSYNC0 is sent out to the printer interface. Upon receipt of the signal, the printer interface 127 shifts the print stop signal STOP0 to "H" level and permits the sending of a horizontally synchronized signal HSYNC0.

The print control unit 129 causes the paper forwarding motor (PFM) 19 to rotate in the forward direction in order to forward the paper 7 which is held at the resist roller 33 to the thermal head 35. Starting with the time when the tip of the paper 7 reaches the position above the thermal head 35, the horizontally synchronized signals HSYNC0 are sent to the printer interface 127. The horizontally synchronized signal HSYNC0 is sent out for a duration that corresponds to the length of the recording paper 7. In addition, corresponding to the sending of the horizontally synchronized signal HSYNC0, the film drive motor (IRM) 47 is driven, and the film 1 is transported at a speed which is one half of the paper forwarding speed. In other words, drive pulses are sent to the microprocessor 171 at the rate of one for every two horizontally synchronized signals HSYNC0.

When the horizontally synchronized signal HSYNC0 is sent out corresponding to the length of the paper 7, the film 1 is further transported in the F direction in the high speed mode. By the detection of the film position hole 81 at the point J7 in FIG. 8 by the first film sensor 63, the drive of the film drive motor 47 is brought to a stop. In this state, the multi-orifice portion 3 of the film is housed in the film cartridge 43 so that the film cartridge 43 is in a state which is tightly shut out from the outside. Further, the stoppage of driving of the paper forwarding motor 19 takes place at the point in time when the rear end of the recorded paper 7 passes by the position above the second paper detection sensor 32 that is provided in the paper ejection unit. When the paper ejection is completed, the page synchronization signal PSYNC0 is changed to "H" level, and the system enters the standby state which is ready to accept the start of the next printing.

When a next printing start signal PSTAT1 is received in this state, since the film 1 is stopped in the state in which the point J7 in FIG. 7 is detected, the print control unit 129 transports the film in the E direction, and gives pulses that correspond to the value NB to the film drive motor 47 until the film arrives at the point J6 which is the point for starting printing.

Moreover, while the film 1 is in transportation, signals from the film motion detection holes are checked. Namely, on the opposite side with respect to the multi-orifice portion 3 of the first portion detection hole 75 on left side and the second position detection hole 79 on right side, there are provided the motion detection holes 82 that are given with a predetermined distance apart. These motion detection holes 82 carry out detection of undetected hole portion of the motion detection hole unit, using a film motion detection sensor 66 which is operated by the same principle as the first film position detection sensor 63. As shown in FIG. 15, signals from the film motion detection sensor 66 are read through the input port by the microprocessor. The spacing of the motion detection holes in this embodiment is given a pitch which corresponds to the length of four pulses that are applied to the film drive motor 47. Accordingly, when the signal changes due to the film motion holes are detected during film transportation, the microprocessor 171 sets predetermined bits in the internal register.

The bits in the above are reset after outputting driving pulses to the film drive motor 47. Then, prior to outputting a fourth driving pulse, a judgment is formed whether or not the above-mentioned bits are actually set. If they are found set, the bits are reset after outputting of the drive pulse, and film transportation is continued. If they are not set, the drive of the heating elements is stopped at that point in time, and the printing operation is brought to an end.

Figure 22:
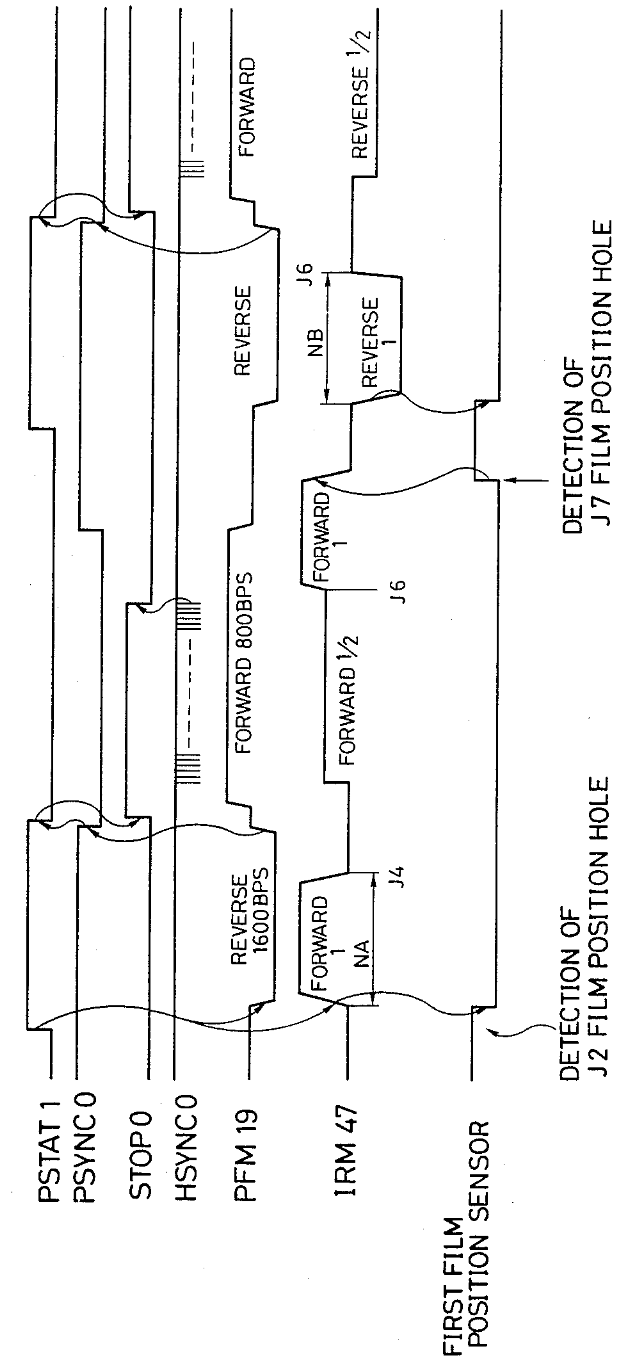
FIG. 22 to FIG. 24 are time charts at the time of letter data printing.
Figure 23:
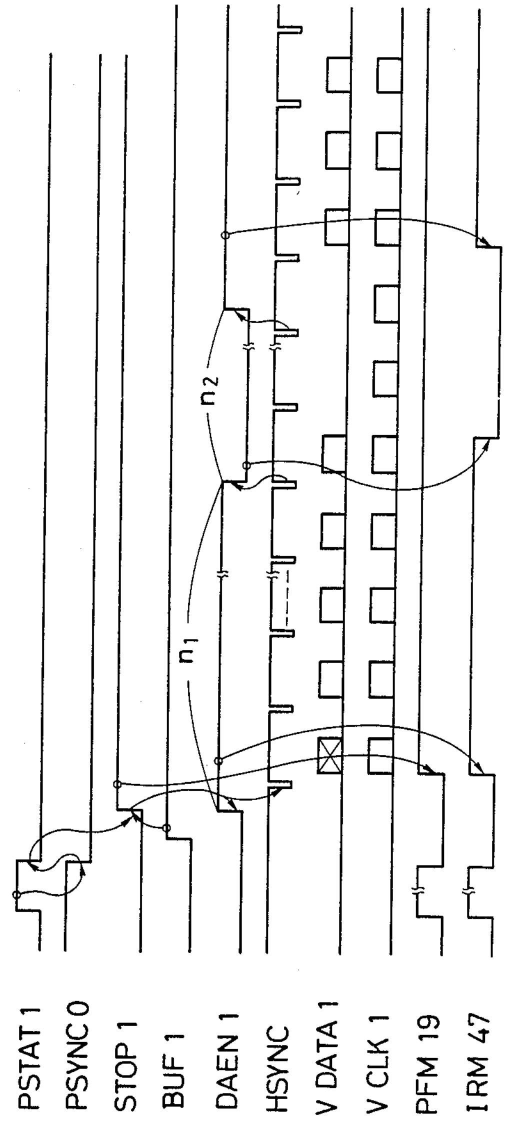
Figure 24:
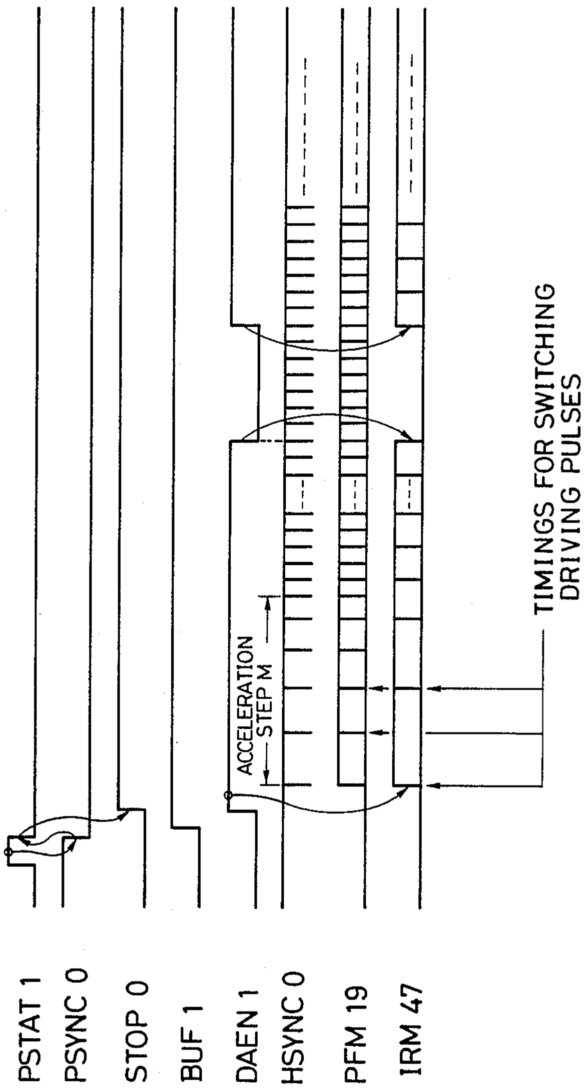

FIG. 23 and FIG. 24 are diagrams that show detailed timings during printing operation shown in FIG. 22.

In FIG. 23, if the page synchronization signal PSYNC0 on the printer interface 127 side becomes "L" level, the print start signal PSTAT1 becomes "L" level.

When the bit development to the image buffer RAM's 163 and 165 is completed, the BUF1 signal which shows the presence of a data that is sent out from the image buffers 163 and 165 becomes "H" level, and the stop signal STOP0 which brings the printing operation to a temporary stop becomes "H" level(that is, releases the stoppage). In addition, the DAEN1 signal which shows that the data sent out is the data to be actually printed, becomes "H" level. With this, the print control unit 129 sends out the horizontally synchronized signal HSYNC0, and sends out one line portion (1728 in number) of the synchronization clock VCLKl of the printing data.

By the horizontally synchronized signal HSYNC0 and synchronization clock signal VCLK1, the printer interface 127 sends out the printing data in the image buffers 163 and 165 to the print control unit 129. In FIG. 42 that shows the aspect of character printing, a line unit is divided into effective lines nl and space feeds n2, as shown in FIG. 21. Accordingly, the DAEN1 signal is controlled so as to have it on "H" level during the period in which n1 line synchronization signals HSYNC0 are sent out. In addition, during the time when the DAENl is on "L" level, that is, in the segments for space feeds, there takes place the simple operation of paper feeding, without carrying out printing, so that the driving of the film drive motor 47 is stopped. When the DAEN1 signal becomes "H" level, the driving of the film drive motor 47 is started.

By arranging to carry out the film transportation operation as above, it is possible to reduce the length of the multi-orifice portion 3 of the film 1.

FIG. 24 is an explanatory diagram about the timing for impressing driving pulses to the paper forwarding motor 19 and to the film drive motor 47 during the operation shown in FIG. 23.

The driving pulses to the paper forwarding motor 19 is given in an accelerated manner as shown in the figure. This is done so because of the inertia that exists in the driving portion, to use the motor more efficiently, by shifting the speed of the motor at the start of the driving from a low speed to a high speed in succession.

Therefore, after completion of the acceleration segment shown in the figure, the paper forwarding motor 19 begins to rotate at a constant speed. The driving pulses for the film drive motor 47 are given synchronized with the driving pulses that are given to the paper forwarding motor 19. However, the film transporting speed for set at one half of the transporting speed of the paper so that the driving pulses for the film drive motor 47 are given at the rate of one for every two driving pulses of the paper forwarding motor 19. In addition, the horizontally synchronized signal HSYNC0 is supplied to the printer interface 127 synchronized with the driving pulse for the paper forwarding motor 19.

The control of the driving pulses to the drive motors 19 and 47 is carried out to realize an accelerated operation and a decelerated operation of the motors 19 and 47, by changing the data set to the timer 199 for each interruption demand. Further, in this example of operation, the data transfer to the image buffers 163 and 165 on the printer interface 127 side is carried out faster then the speed of printing, so that both of the stop signal STOP0 and the BUF1 signal are in "H" level state and the paper forwarding motor 19 is operated continuously without being halted.

Figure 27:
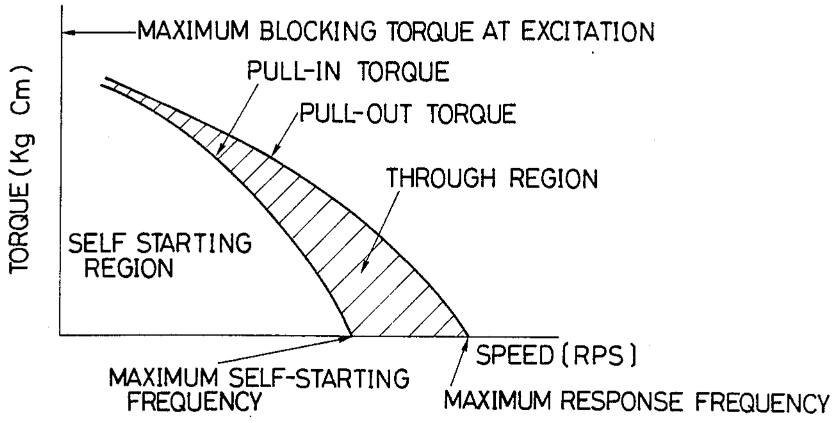
FIG. 27 is a diagram which shows the speed-torque characteristic, of the pulse motor.
Figure 28:
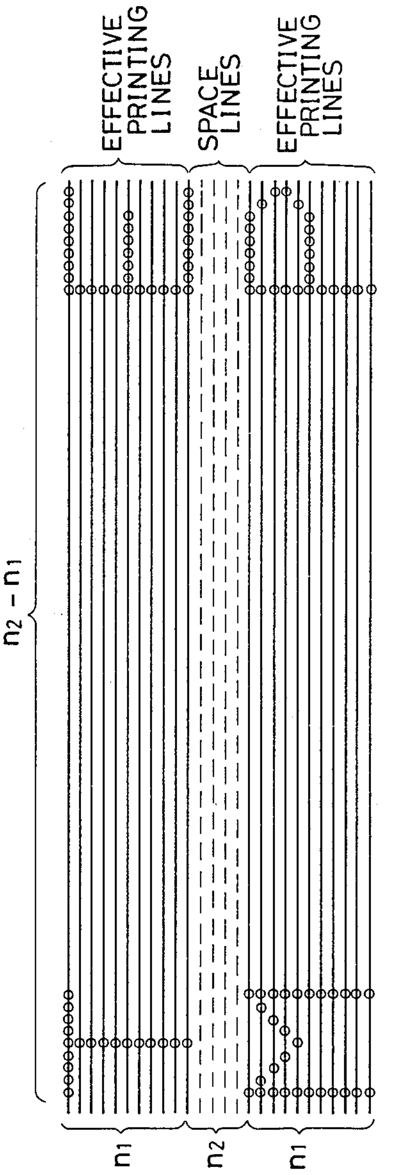
FIG. 28 is an example of printed letters.

In bringing the film drive motor 47 to a temporary stop, it is realized instantly without going through a deceleration operation. This is possible because the film drive motor 47, has a smaller speed value (one half) than that of the paper forwarding motor 19, has a smaller inertia of load, and is driven at a frequency in the self-starting region of the pulse motor (see FIG. 27).

Therefore, for a temporary stop of the film drive motor 47 when the paper forwarding motor 19 is operating continuously at a constant speed, there is not required a special deceleration step.

Control in the Image Data Printing

Figure 25:
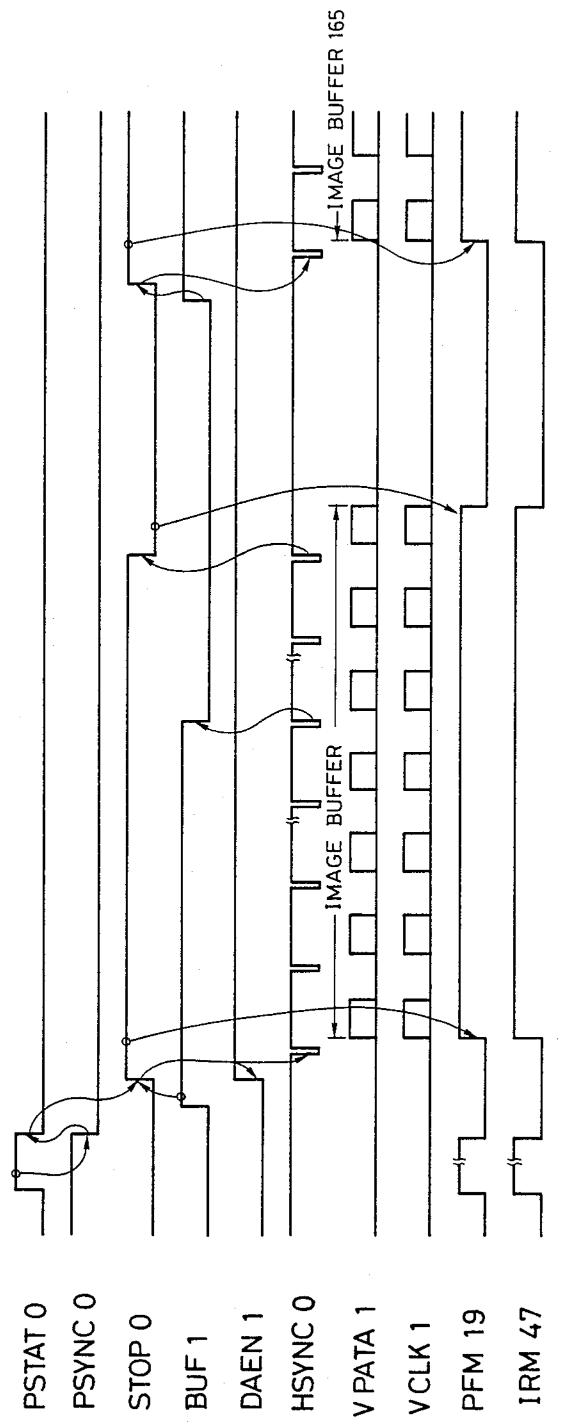
FIG. 25 and FIG. 26 are time charts in the case of image data printing.
Figure 26:
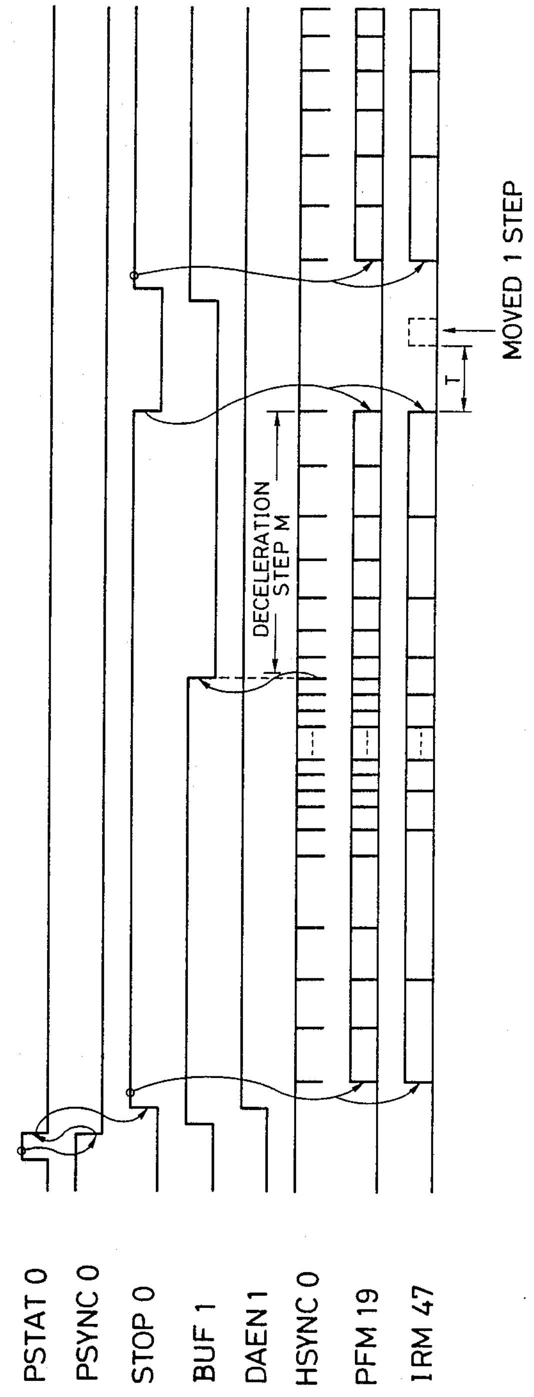

FIG. 25 and FIG. 26 show timing charts in printing an image data.

The paper transportation at the start of printing and the operation of the film drive motor are the same as in FIG. 23. The operation shown in FIG. 25 shows the case of printing an image data. Data are sent out from the image buffers 163 and 165 in FIG. 13 in the order of the image buffer 163 first and the image buffer 165 next. During the time when a first data is sent out from the image buffer 163, there takes place a data transfer from the host-side system 125 to the image buffer 165. In the figure, operational timings are illustrated for the case in which data transfer speed from the host-side system 125 is low such that it cannot catch up with the speed in the other side.

The DAEN1 signal that indicates the effectiveness of the printing is kept in "H" level state all times because the data involved is an image data. And, the STOP0 signal and the BUF1 signal are controlled as follows.

First, since the data transfer to the image buffer 165 is completed during the first sending of the data, the BUF1 signal is shifted to "L" level at a midpoint in the data transfer from the image buffer 163. At this point, on the print control unit 129 side, deceleration step of the paper forwarding motor 19 begins. Accordingly, the paper forwarding motor 19 and the film drive motor 47 that is driven synchronized with the paper forwarding motor 19, are decelerated respectively. Then, by a change to "L" level of the STOP0 signal from the printer interface 127, both drive motors 19 and 47 are brought to stop.

The printing of a second data block is started at the completion of the transfer of data from the host-side system 125 to the image buffer 165. Namely, by the completion of transfer of data to the image buffer 165, the BUFl signal is changed to "H" level and the STOP0 signal is also changed to "H" level, which releases the temporary halt of the printing operation. The print control unit 129 drives again the paper forwarding motor 19 in the acceleration mode, and carries out printing of the second data block by generating horizontally synchronized signals.

FIG. 26 is an explanatory diagram for showing the timings of impressing the pulses to the paper forwarding motor 19 and the film drive motor 47, in the operation shown in FIG. 25.

The first acceleration timings for block printing is the same as for FIG. 24. A deceleration, after a change to "L" level of the BUFl signal, is carried out in M steps. The deceleration control for this is carried out also by changing the data set of the timer 199 shown in FIG. 22.

The deceleration for the paper forwarding motor 19 is carried out in steps of M which is the same number as for acceleration. Therefore, the BUF1 signal is controlled so as to be changed to "L" level by the line synchronization signal HSYNC0 which appears M steps prior to the temprorary halt. In this control, the printing unit line is set by the printing conditions at that time. Therefore, if the transfer to the next image buffer is completed at the point in time at which there is generated a borrow signal of a data transfer counter (which is counted down by the line synchronization signal HSYNC0) which is not shown and is provided in the printer transfer controller 159 of the printer interface 127, by the counting of the line synchronization signal HSYNC0, the BUF1 signal is set to "L" level. Therefore, the initial value of the counter that is set equals the value which is obtained by subtracting the value of step number M from the number of unit lines.

Figure 29:
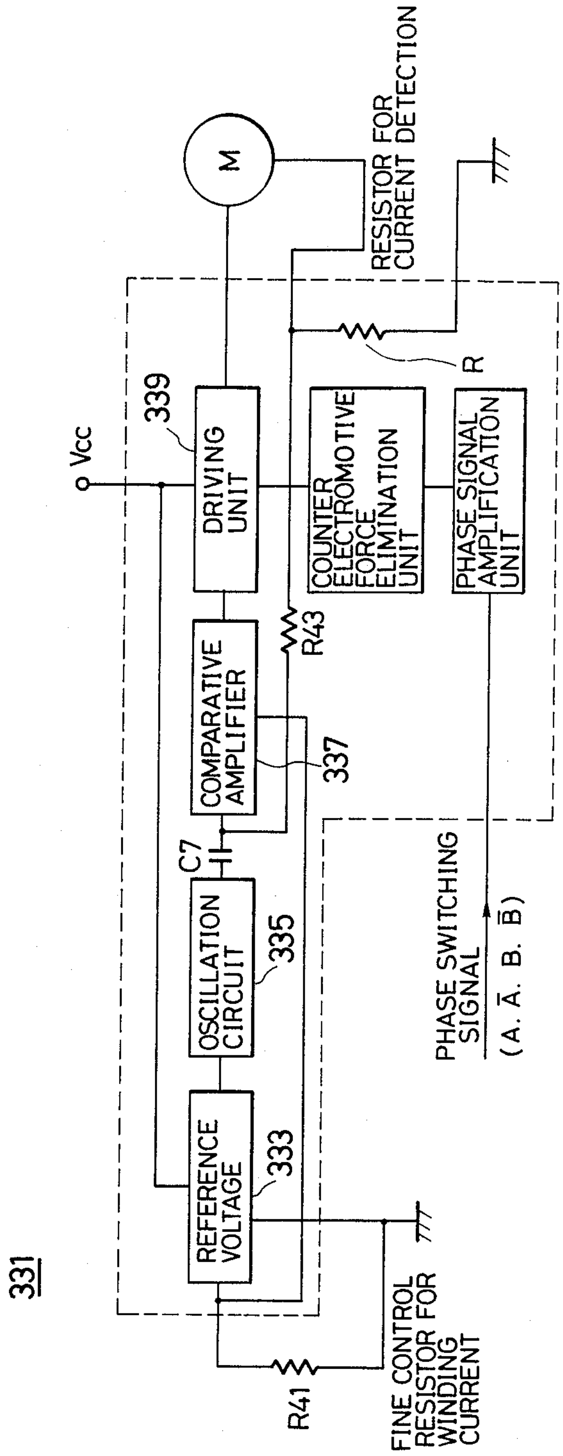
FIG. 29 is a block diagram which shows the configuration of the pulse motor driver IC.

In FIG. 29 is shown an internal block diagram of a pulse motor driver IC 331 which is used for the pulse motor driving circuit 177. This IC is a driver of constant current chopping type, and use was made of SI-7115B made by Sanken Electric Co.

In FIG. 29, a reference voltage unit 333 is a circuit for generating a predetermined constant voltage from the supply voltage Vcc. A first output is connected to an oscillation circuit 335, and a second output which is generated by a division with an internal resistor of the first output is connected to an external resistor R41 and a comparative amplifier 337.

The oscillation circuit unit 335 is a circuit which creates a triangular wave for chopping control, and its output is given to the comparative amplifier 337 through a capacitor C7. The capacitor C7 is connected to a resistor R43 wich is connected to a motor current detection resistor $R_Y$. Accordingly, to the input on the capacitor C7 side of the comparative amplifier 337, there is supplied the resultant voltage of the output obtained by voltage transforming the motor current and the triangular wave from the oscillation circuit 335.

In the comparative amplifier 337, the second reference output from the reference voltage and the resultant voltage are compared, and only the portion to which is applied the resultant voltage which is smaller than the second reference output, is given to the driving unit 339 as a driving pulse signal. Accordingly, the pulse width of the driving pulse becomes stable at the point when a current flows in the motor, and the current becomes to have a value which corresponds to the second reference output voltage. In other words, the motor current is increased when the second reference output voltage becomes large, and is decreased when the output voltage becomes small.

Figure 30:
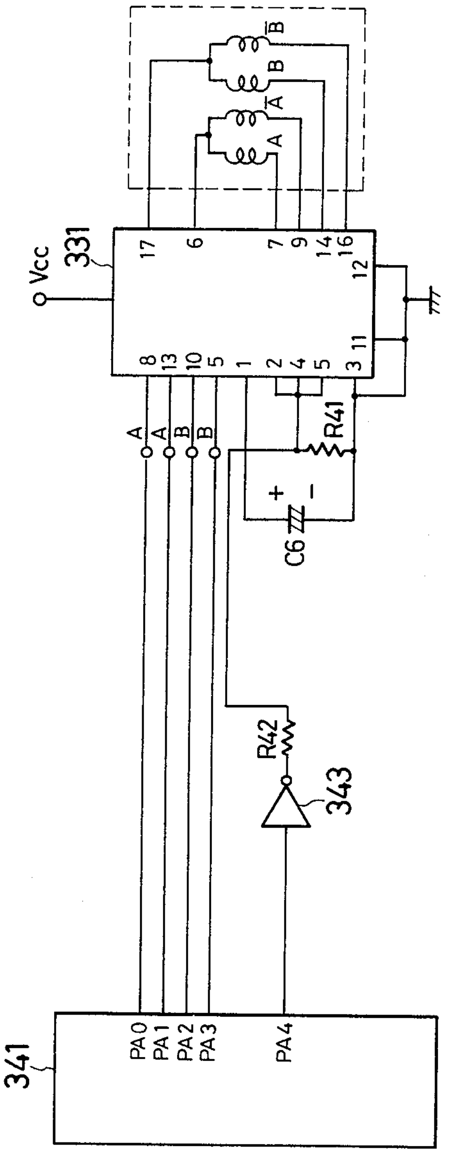
FIG. 30 is a block diagram which shows the circuit for film transportation that makes use of the pulse motor driver IC.

FIG. 30 shows details of the motor unit and the motor driving circuit 177, and the film driving unit of the output port shown in FIG. 29.

In FIG. 30, 341 is an I/O port for outputting a driving signal that drives the motor drive IC, PA0 to PA3 output driving signals for various phases of the pulse motor, and PA4 outputs a signal that controls the current in the winding of the motor drive IC 331.

To the fourth and the fifth pins of the reference voltage terminals of the comparative amplification circuit 337 in the motor drive IC 331, there are impressed voltages that are divided by a resistor R41 and the resistors within the IC. To the fourth and fifth pins there is further connected a resistor R42 which is connected in turn to the output terminal of the open collector inverter 343. Because of this, when the output transistor of the inverter 343 is turned on, the resistor R41 and the resistor R42 become to be connected in parallel, so that the second reference voltage becomes low. Accordingly, the current flowing in the motor is different for the cases where the inverter 343 is turned on and off, and the current in the winding becomes large when the signal level of the output port PA4 is "L" and small when "H".

The winding current control signal of the output port PA4 becomes "L" level at the time of setting an initial value for the film, namely, when the film is rotated and transported at high speed, current flowing in the winding of the pulse motor is increased, so that it becomes possible to have a fast driving. In addition, during printing, namely, when the film is transported at a low speed, not much driving torque is required so that it becomes "H" level and the current is decreased.

As in the above, by controlling the current that flows in the winding, it is possible to operate the apparatus at high speed at its setting, and during printing it is possible to control noise, and especially vibrations, by reducing the driving current. By reducing vibration of the motor during printing, vibrations of the film can also be reduced, so that the resolving power of printing can be improved.

Effects of the Invention

As described in detail in the foregoing, according to the present invention, when the main switch is turned off, the main power source is held to turn on condition and is turned off after the multi-orifice portion of the film is housed in the cartridge. Therefor, the drying of the ink and the blinding of the multi-orifice portion is surely prevented.

Various modifications will become possible for those skilled in the art after receiving the teachings of the present disclosure without departing from the scope thereof.

What is claimed is:

1. A recording apparatus of the type which is for filling recording ink in a film with numerous minute orifices and heating the ink rapidly with heating elements to spurt the ink from the orifices by means of the pressure of bubbles generated by the heating, to record data on a member by using an external source voltage, comprising:

main switching means operable between ON/OFF states for controlling the ON/OFF condition of the source voltage;

first detection means for detecting the ON/OFF state of said main switching means;

a film housing for tightly sealing the film therein;

means for variably controlling the motion of the film, said film motion control means operative to transport a predetermined portion of the film into said film housing in repsonse to the OFF state of said first detection means;

second detection means for detecting and for supplying a detection signal indicating that the predetermined portion of the film is contained in said film housing;

a main power supply connected to the main switching means for supplying operating power from the source voltage to at least said film motion control means at times when said switching means in the ON state; and means responsive to the OFF state of the main switching means for shutting off the supply of the source voltage to said main power supply only at times when a detection signal is supplied from said second detection means.

2. The recording apparatus as claimed in claim 1, wherein said shut-off means includes means for rendering ineffective the shutting off of the supply of the source voltage to said main power supply in response to said main switching means being in the OFF state if a detection signal is not supplied from said second detection means.

3. The recording apparatus as claimed in claim 1, wherein said film housing comprises a film cartridge and wherein the predetermined portion of the film comprises a multi-orifice portion.

4. The recording apparatus as claimed in claim 1, wherein said shut-off means comprises a circuit constructed to shut off the supply of the source voltage to said main power supply only at times when a detection signal is supplied from said second detection means, irrespective of the ON/OFF state of said main switching means.

5. A recording apparatus of the type which is for filling recording ink in a film with numerous minute orifices and for heating the ink rapidly with heating elements to spurt the ink from the orifices by means of the pressure of bubbles generated in heating to record data on a member to be recorded by using a source voltage from outside, comprising:

main switching means for controlling an ON/OFF state of a source power;

means for detecting an ON/OFF state of said main switching means;

means for housing the film in a tightly sealed state;

means for transporting the film inside of and outside of the film housing means;

means for detecting and for generating a detecting signal indicating that a predetermined portion of the film is outside of the film housing means; and means for supplying operating power to said film transporting means even when said main switching means is in the OFF state such that said film transporting means transports the predetermined portion of the film into said film housing means in accordance with a detecting signal from said film detecting means.

6. The recording apparatus as claimed in claim 5, wherein the predetermined portion of the film is a multi-orifice portion in which ink is filled.

7. The recording apparatus as claimed in claim 6, wherein the multi-orifice portion of the film is always housed in said housing means in the tightly sealed state when said main switching means is in the OFF state, thereby preventing an evaporation of the ink in the multi-orifice portion in the OFF state of said main switching means.

8. The recording apparatus as claimed in claim 7, wherein said operating power supplying means comprises a line switching power supply for supplying the operating power to at least said film transporting means by receiving the source voltage and a relay circuit constructed to shut off the supply of the source voltage to the line switching power supply only when a detecting signal is supplied from said film detecting means, even if said main switching means is in the OFF state.

* * * * *